(12) United States Patent
Agarwal et al.

(10) Patent No.: US 11,838,275 B2
(45) Date of Patent: Dec. 5, 2023

(54) WEB ENDPOINT DEVICE HAVING AUTOMATIC SWITCHING BETWEEN PROXIED AND NON-PROXIED COMMUNICATION MODES

(71) Applicant: Forcepoint, LLC, Austin, TX (US)

(72) Inventors: Kunal Agarwal, Mountain View, CA (US); Aidan Power, Cork (IE); Sergii Shkonda, Cork (IE); Timothy O'Leary, Cork (IE)

(73) Assignee: Forcepoint LLC, Austin, TX (US)

( * ) Notice: Subject to any disclaimer, the term of this patent is extended or adjusted under 35 U.S.C. 154(b) by 96 days.

(21) Appl. No.: 17/200,437

(22) Filed: Mar. 12, 2021

(65) Prior Publication Data

US 2022/0294766 A1    Sep. 15, 2022

(51) Int. Cl.
*H04L 29/00* (2006.01)
*H04L 9/40* (2022.01)
*H04L 67/61* (2022.01)

(52) U.S. Cl.
CPC ...... *H04L 63/0281* (2013.01); *H04L 63/0272* (2013.01); *H04L 63/102* (2013.01); *H04L 63/20* (2013.01); *H04L 63/306* (2013.01); *H04L 67/61* (2022.05)

(58) Field of Classification Search
CPC . H04L 63/0281; H04L 67/61; H04L 63/0272; H04L 63/102; H04L 63/20; H04L 63/306
USPC .......................................................... 726/11
See application file for complete search history.

(56) References Cited

U.S. PATENT DOCUMENTS

| | | |
|---|---|---|
| 6,366,926 B1 | 4/2002 | Pohlmann et al. |
| 8,863,297 B2 | 10/2014 | Sharma et al. |
| 8,955,091 B2 | 2/2015 | Kailash et al. |
| 9,081,940 B2 | 7/2015 | Trevor et al. |
| 10,147,065 B1 | 12/2018 | Yiftachel et al. |
| 10,496,815 B1 | 12/2019 | Steiman et al. |

(Continued)

OTHER PUBLICATIONS

Goebel et al., Comparing Ingress and Egress Detection to Secure Interdomain Routing: An Experimental Analysis, Dec. 2011, ACM, vol. 11, No. 2, Article 5, pp. 5:1-5:26.

(Continued)

*Primary Examiner* — Brandon Hoffman
*Assistant Examiner* — Michael D Anderson
(74) *Attorney, Agent, or Firm* — Terrile, Cannatti & Chambers; Stephen A. Terrile

(57) ABSTRACT

A method, system, and computer-usable medium are disclosed, comprising: initiating a web transaction between an endpoint device and a target web server; automatically switching between a first communication mode and a second communication mode in response to one or more communication performance conditions associated with conducting the web transaction, where the endpoint device communicates with the target web server using an intermediate proxy server in the first communication mode; and the endpoint device communicates with the target web server without using the intermediate proxy server in the second communication mode. Other embodiments include corresponding computer systems, apparatus, and computer programs recorded on one or more computer storage devices, each configured to perform the actions of the methods.

20 Claims, 12 Drawing Sheets

(56) References Cited

U.S. PATENT DOCUMENTS

| | | |
|---|---|---|
| 2002/0104014 A1 | 8/2002 | Zobel et al. |
| 2002/0156601 A1 | 10/2002 | Tu et al. |
| 2003/0093479 A1* | 5/2003 | Mellen-Garnett ........ G06F 9/54 |
| | | 709/205 |
| 2003/0105801 A1 | 6/2003 | Tse et al. |
| 2005/0108574 A1* | 5/2005 | Haenel ................. H04L 69/329 |
| | | 726/4 |
| 2005/0229183 A1 | 10/2005 | Araujo et al. |
| 2008/0086759 A1 | 4/2008 | Colson |
| 2008/0288330 A1 | 11/2008 | Hildebrand et al. |
| 2009/0177985 A1 | 7/2009 | Mueller et al. |
| 2009/0199264 A1 | 8/2009 | Lang |
| 2010/0064341 A1 | 3/2010 | Aldera |
| 2010/0169474 A1 | 7/2010 | Beckett, III et al. |
| 2010/0212010 A1 | 8/2010 | Stringer et al. |
| 2011/0225650 A1 | 9/2011 | Margolies et al. |
| 2011/0246460 A1 | 10/2011 | Hsieh et al. |
| 2011/0246988 A1 | 10/2011 | Hui et al. |
| 2011/0307957 A1 | 12/2011 | Barcelo et al. |
| 2013/0246605 A1 | 9/2013 | Mahadik et al. |
| 2014/0007132 A1 | 1/2014 | Gaxiola et al. |
| 2015/0074750 A1 | 3/2015 | Pearcy et al. |
| 2015/0229624 A1 | 8/2015 | Grigg et al. |
| 2015/0339477 A1 | 11/2015 | Abrams et al. |
| 2016/0004862 A1 | 1/2016 | Almehmadi et al. |
| 2016/0180078 A1 | 6/2016 | Chhabra et al. |
| 2016/0205106 A1 | 7/2016 | Yacoub et al. |
| 2016/0226911 A1 | 8/2016 | Boss et al. |
| 2016/0232352 A1 | 8/2016 | Chen et al. |
| 2016/0232353 A1 | 8/2016 | Gupta et al. |
| 2016/0248797 A1 | 8/2016 | Yampolskiy et al. |
| 2016/0321352 A1 | 11/2016 | Patel et al. |
| 2016/0328562 A1 | 11/2016 | Saxena et al. |
| 2016/0357778 A1 | 12/2016 | MacKenzie et al. |
| 2017/0070506 A1 | 3/2017 | Reddy et al. |
| 2017/0230417 A1 | 8/2017 | Amar et al. |
| 2017/0286671 A1 | 10/2017 | Chari et al. |
| 2018/0004948 A1 | 1/2018 | Martin et al. |
| 2018/0027006 A1 | 1/2018 | Zimmermann et al. |
| 2018/0084012 A1 | 3/2018 | Joseph et al. |
| 2018/0124091 A1 | 5/2018 | Sweeney et al. |
| 2018/0218157 A1 | 8/2018 | Price et al. |
| 2018/0302266 A1 | 10/2018 | Makovsky et al. |
| 2018/0307833 A1 | 10/2018 | Noeth et al. |
| 2018/0309795 A1 | 10/2018 | Ithal et al. |
| 2018/0316684 A1 | 11/2018 | Desai et al. |
| 2018/0337971 A1 | 11/2018 | Aleksandrov |
| 2018/0341758 A1 | 11/2018 | Park et al. |
| 2019/0044914 A1* | 2/2019 | Kleiner .................. H04L 63/10 |
| 2019/0066670 A1 | 2/2019 | White et al. |
| 2019/0205533 A1 | 7/2019 | Diehl et al. |
| 2019/0318128 A1 | 10/2019 | Ackerman et al. |

OTHER PUBLICATIONS

Papagiannapoulou et al., Concept-Based Image Clustering and Summarization of Event-Related Image Collections, Nov. 7, 2014, ACM, pp. 23-28.

Pramit Choudhary, Introduction to Anomaly Detection, Oracle Data Science, Feb. 15, 2017 https://blogs.oracle.com/datascience/introduction-to-anomaly-detection.

Anomaly, Detecting Anomalies with Moving Median Decomposition, Jan. 12, 2016 https://anomaly.io/anomaly-detection-moving-median-decomposition/.

NRCS, U.S. Department of Agriculture, Natural Resources Conservation Service, Media vs. Average to Describe Normal, downloaded Jul. 8, 2020, https://www.wcc.nrcs.usda.gov/normals/median_average.htm.

The Mitre Corporation, Mitre ATT&CK, Enterprise Matrix screenshot, Jul. 2, 2020, https://attack.mitre.org/matrices/enterprise/.

Du et al., Defense Deployment with Network Egress and Ingress Filtering, 2010, IEEE, pp. 1-6.

Manusankar et al., Intrusion Detection System with Packet Filtering for IP Spoofing, Dec. 29, 2010, IEEE pp. 563-567.

* cited by examiner

WEB ENDPOINT DEVICE HAVING AUTOMATIC SWITCHING BETWEEN PROXIED AND NON-PROXIED COMMUNICATION MODES

BACKGROUND OF THE INVENTION

Field of the Invention

The present invention relates in general to the field of computers and similar technologies, and in particular to software utilized in this field. Still, more particularly, it relates to an endpoint device that automatically switches between proxied and non-proxied communication modes when communicating with a target server.

Description of the Related Art

Users interact with Internet-based content of all kinds on a daily basis. Each of these interactions poses some degree of security risk. As an example, a user's device may inadvertently become infected by malware embedded in seemingly innocent content provided by what appears to be a legitimate source. A common approach to addressing this issue is the use of a proxy server, which acts as an intermediary for requests from endpoint devices seeking content from other servers. One known advantage to such an approach is the proxy server can maintain a list of suspicious sites or servers, which can, in turn, be used to block the user's device from connecting to particular servers. By doing so, the proxy server can prevent potentially malicious content from being returned to the user's device.

SUMMARY OF THE INVENTION

A system of one or more computers can be configured to perform particular operations or actions by virtue of having software, firmware, hardware, or a combination of them installed on the system that in operation causes or cause the system to execute web transactions between an endpoint device and a target web server. At least one embodiment is directed to a computer-implemented method. The computer-implemented method includes initiating a web transaction between an endpoint device and a target web server; automatically switching between a first communication mode and a second communication mode in response to one or more communication performance conditions associated with conducting the web transaction, where the endpoint device communicates with the target web server using an intermediate proxy server in the first communication mode; and the endpoint device communicates with the target web server without using the intermediate proxy server in the second communication mode. Other embodiments of this aspect include corresponding computer systems, apparatus, and computer programs recorded on one or more computer storage devices, each configured to perform the actions of the methods.

In at least one embodiment, the communication performance conditions include one or more network communication performance conditions, including: a change in availability of a network used in the web transaction; whether the endpoint device is using a virtual private network for communication with the target web server; network communication speed between the endpoint device and the target web server; communication latency between the endpoint device and the target web server; a quality of service condition of the communications between the endpoint device and the target web server; network communication speed between the endpoint device and a secured web gateway server; communication latency between the endpoint device and the secured web gateway server; and a quality of service condition of the communications between the endpoint device and the secured web gateway server.

In at least one embodiment, the second communication mode includes establishing a side channel to a security service when the endpoint device initiates the web transaction with a web-enabled application; and using the side channel to enforce a security policy at the endpoint device, where the security policy is stored at the security service.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
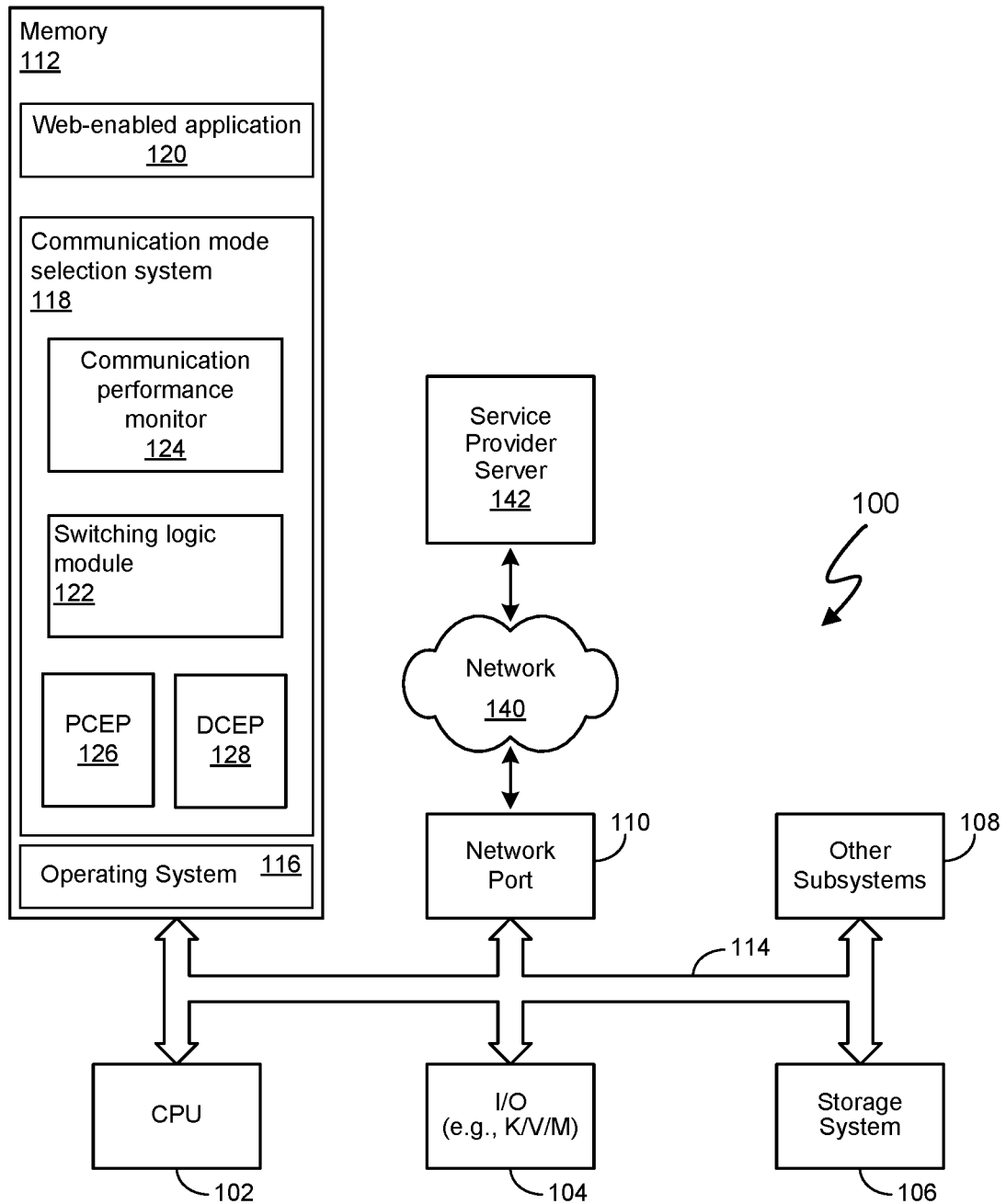
FIG. 1 is a generalized illustration of an endpoint device that can be used to implement various embodiments of the systems and methods set forth in the present disclosure.

Certain aspects of the present disclosure are implemented with an appreciation that a proxy server, whether implemented as a specialized information handling system or as a software application, acts as an intermediary for requests from endpoint devices seeking resources from a target server. In general, and an endpoint device first establishes communication with a proxy server. Once the communication is established, the user may request a particular service, such as a file, connection, web page, or other resource available from a different server. In turn, the proxy server evaluates the request to determine whether it can simplify, manage or constrain its complexity. Once such an evaluation is completed, the proxy server may forward the request to the target server.

Certain aspects of the present disclosure are implemented with an appreciation that one reason for the development of proxy servers was to add structure and encapsulation to distributed systems. Today, many proxy servers are configured as web proxies, which facilitate access to web-enabled content by providing anonymity, bypassing IP address blocking, or a combination of the two. Proxy servers can also be used to censor undesirable content through the implementation of a particular type of proxy, commonly referred to as a content filter. Other approaches to such censorship involve the use of a cache-extension protocol such as Internet Content Adaption Protocol (ICAP), which allows plug-in extensions to an open caching architecture.

Certain aspects of the present disclosure are implemented with an appreciation that various proxy servers, such as a content filtering proxy, often support user authentication to control web access. Certain aspects of the disclosure are implemented with an appreciation that a target server typically sees the egress Internet Protocol (IP) address of the user's browser traffic. Accordingly, the target server can provide content that is localized for the user's location. However, it will likewise be appreciated that the use of a proxy server generally results in a target server seeing the IP address of the proxy server, not the IP address of the user's browser. As a result, content provided by the target server may be incorrectly localized for the user, as it will likely be localized for the location of the proxy server, which may be in a different location.

Certain aspects of the present disclosure are implemented with an appreciation that third-party security systems may compromise content localization, irrespective of the geographic location of the user. As an example, a mobile user may temporarily connect to a customer's network, which is secured by a third-party security system. As a result, content provided by a target server may be localized for the location of the third-party security system, rather than the actual location of the user. Certain aspects of the present disclosure are implemented with an appreciation that certain geographical firewalls may block proxied web traffic. As an example, certain nations implement firewalls that block proxied web traffic, in general, or to certain websites or Uniform Resource Locators (URLs). As another example, proxied web traffic may be geofenced by implementing a firewall that blocks such traffic to addresses outside a particular geographical area.

Certain aspects of the present disclosure are implemented with an appreciation that various proxy approaches rely on the use of a proxy auto-config (PAC) file to redirect web traffic associated with a user's browser to a proxy server for analysis. It will likewise be appreciated that the usefulness of such PAC files to redirect web traffic to proxy servers relies on predictable browser behavior to enforce their use. However, such behavior can vary from browser to browser, and version to version, where the resulting affect may range from possible connection delays to completely lost connections.

Certain aspects of the present disclosure are implemented with an appreciation that not all websites work well with a proxy server, either in general, or with certain proxy server implementations. Accordingly, a user may be blocked from accessing such sites, even though they pose no known security threat. Certain aspects of the present disclosure include an appreciation that not all web applications work well with proxy servers, either in general, or with certain implementations. Accordingly, a user may experience difficulty when using such applications in combination with a proxy server, even though the application may otherwise work effectively and as intended.

Certain aspects of the present disclosure are implemented with an appreciation that while various web gateway approaches may provide web traffic proxying via data centers or points-of-presence (PoP), such approaches generally fail to address certain issues associated with proxy servers, as described in greater detail herein. Certain aspects of the present disclosure are implemented with an appreciation that various web gateway approaches may provide traffic tunneling via Internet Protocol Security (IPSec), policy-based routing (PBR), or generic routing encapsulation (GRE) to data centers or PoPs. However, such approaches generally fail to address certain issues associated with proxy servers, as described in greater detail herein. Furthermore, they typically do not support use cases involving roaming users. Certain aspects of the present disclosure are implemented with an appreciation that various web gateway approaches may provide an on-premises lightweight appliance that provides local filtering capabilities while being managed from the cloud. While such approaches may address certain issues associated with proxy servers, as described in greater detail herein, they not only require the deployment and maintenance of such appliances, they also generally fail to support roaming users.

Certain aspects of the present disclosure are implemented with an appreciation that the use of an intermediate proxy server is useful in certain web transactions, while being less than optimal in other web transactions. Certain aspects of the present disclosure are implemented with an appreciation that an alternative communication mode in which the intermediate proxy server is not used may be better suited in certain web transactions. Certain aspects of the present disclosure are implemented with an appreciation that the endpoint device may automatically switch between a proxied communication mode and a non-proxied communication mode in response to communication performance criterion.

A method, system, and computer-usable medium are disclosed for automatically switching between a first communication mode and a second communication mode in response to one or more communication performance conditions associated with conducting a web transaction. In one example, the endpoint device communicates with a target web server using an intermediate proxy server in the first communication mode. In certain embodiments, the endpoint device bypasses the intermediate proxy server to communicate with the targeted web server in the second communication mode. The endpoint device may automatically switch between the first communication mode and the second communication mode in response to changes in the communication performance conditions.

The communication performance conditions that may be used as a basis for the initial selection of the communication mode and/or the switching between the communication modes are varied. In certain embodiments, the communication performance conditions include one or more of 1) a change in availability of a network used in the web transaction, 2) whether the endpoint device is using a virtual private network for communication with the target web server, 3) the network communication speed between the endpoint device and the target web server, 4) the communication latency between the endpoint device and the target web server, 5) a quality of service condition of the communications between the endpoint device and the target web server, 6) the network communication speed between the endpoint device and a secured web gateway server, 7) the communication latency between the endpoint device and the secured web gateway server, and 8) a quality of service condition of the communications between the endpoint device and the secured web gateway server. Based on the teachings of the present disclosure, it will be recognized that other communication performance conditions may also be employed in communication mode determinations.

In certain embodiments, a security policy is enforced when the endpoint device is directly communicating with the target server without accessing an intermediate proxy server. As used herein, such direct communication between an endpoint device and a target server without accessing an intermediate proxy server may be variously referred to as "directly-connected," a "direct-connection," or a "direct-connect" communication between the endpoint device and the target server. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, as well as various input and output (I/O) devices, such as a keyboard, a mouse, and a graphics display.

FIG. 1 is a generalized illustration of an endpoint device 100 (e.g., an information handling system) that can be used to implement various embodiments of the systems and methods set forth in the present disclosure. The endpoint device 100 includes a processor (e.g., central processor unit or "CPU") 102, input/output (I/O) devices 104, such as a display, a keyboard, a mouse, and associated controllers, a storage system 106, and various other subsystems 108. In various embodiments, the endpoint device 100 also includes a network port 110 operable to connect to a network 140, which is likewise accessible by a service provider server 142. The endpoint device 100 likewise includes system memory 112, which is interconnected to the foregoing via one or more buses 114. System memory 112 further includes an operating system (OS) 116 and in various embodiments may also include a communication mode selection system 118 and a web-enabled application 120. In certain embodiments, the endpoint device 100 is able to download the communication mode selection system 118 from the service provider server 142. In another embodiment, the communication mode selection system 118 is provided as a service from the service provider server 142.

In various embodiments, the communication mode selection system 118 selects a communication mode that is used by the endpoint device 100 in communications with a target server. As will be appreciated, once the endpoint device 100 is configured to perform the communication mode selection, the endpoint device 100 becomes a specialized computing device specifically configured to perform the communication selection operation and is no longer a general-purpose computing device. Moreover, the implementation of the communication mode selection system 118 on the endpoint device 100 improves the communication functionality of the endpoint device 100 and provides a useful and concrete result.

In the example shown in FIG. 1, the communication mode selection system 118 is configured to automatically switch between a first communication mode in which the endpoint device 100 communicates with a target server using an intermediate proxy server, and a second communication mode in which the endpoint device 100 communicates with the target server without using the intermediate proxy server. In this embodiment, the communication mode selection system 118 is in communication with the web-enabled application 120. The communication mode selection system 118 intercepts web transaction data of the web-enabled application 120 at, for example, a switching logic module 122 and forwards the web transaction data to a target web server using a communication mode that is dependent on the communication performance conditions associated with conducting a web transaction with the target web server as detected by a communication performance monitor 124 that monitors communication performance conditions, such as the conditions described herein. Based on the communication performance conditions detected by the communication performance monitor 124, the switching logic module 122 communicates with the target web server using a proxy connected endpoint system 126 (PCEP) or a direct-connect endpoint system 128 (DCEP). Responses and requests from the target web server that are received by the PCEP system 126 or DCEP system 128 are ultimately communicated to the web-enabled application 120. The web transaction between the web-enabled application 120 and the target web server is subject to security policies respectively implemented at the PCEP system 126 and DCEP system 128. In certain embodiments, substantially the same security policies are implemented at both the PCEP system 126 and DCEP system 128.

As described herein, the endpoint device 100 is an information processing system, such as a personal computer, a laptop computer, a tablet computer, a personal digital assistant (PDA), a smartphone, a mobile telephone, a digital camera, a video camera, or other device capable of storing, processing and communicating data. In various embodiments, the communication of the data may take place in real-time or near-real-time. In certain embodiments, the communication of the information may take place asynchronously. For example, an email message may be stored on the endpoint device 100 when it is offline. In this example, the information may be communicated to its intended recipient once the endpoint device 100 gains access to a network 140.

Figure 2:
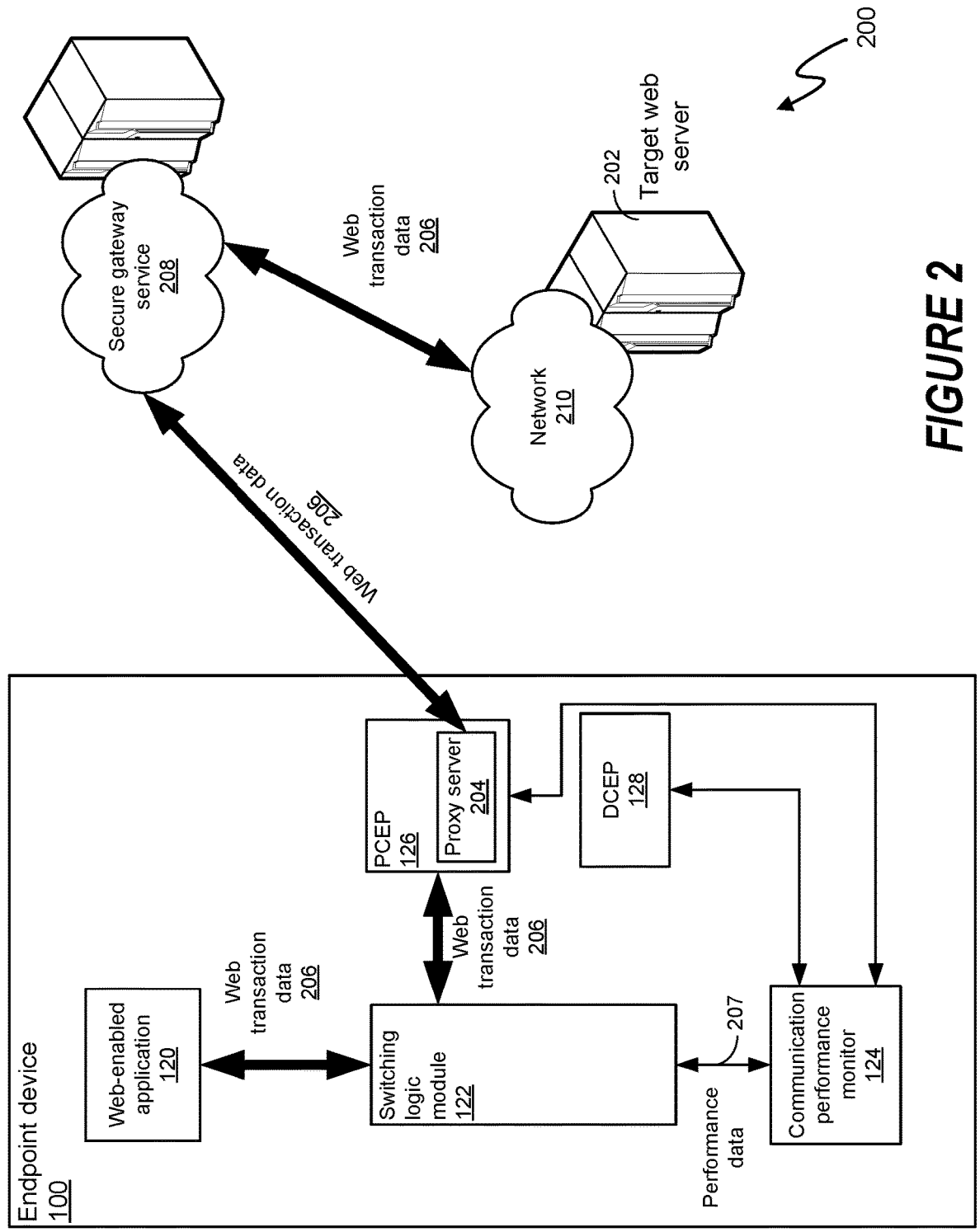
FIG. 2 is a simplified diagram of an electronic environment in which the endpoint device conducts a web transaction with a target web server in a first mode of communication that employs an intermediate proxy server.

FIG. 2 is a simplified diagram of an electronic environment 200 in which the endpoint device 100 conducts a web transaction with a target web server 202 in a first mode of communication that employs an intermediate proxy server 204. In this example, a web transaction is initiated by a user using the web-enabled application 120 and involves web transaction data 206 that is used in conducting a web transaction with the target web server 202. Here, the web transaction data 206 is shown as a bidirectional stream where web transaction data 206 intended for the target web server 202 is generated by the web-enabled application 120, and web transaction data 206 intended for the web-enabled application 120 is generated by the target web server 202.

Although the web transaction data 206 is designated with the same reference numeral throughout the figures, it will be recognized that the actual data may vary along different communication segments of the transaction. As an example, the web transaction data 206 may be encapsulated and/or modified at various waypoints along the transmission path to conform to HTTP standards. As a further example, the transmission and receipt of the web transaction data 206 may be subject to operations defined, for example, by security policies enforced by the intermediate proxy server 204. As such, the web transaction data 206 in the figures is intended to show a flow of web transaction data, not the specific content of the data in each segment of the transmission path.

The web-enabled application 120 generates web transaction data 206 for communication to the target web server 202, which is then intercepted by the switching logic module 122. Based on the communication performance data 207 provided by the communication performance monitor 124, the switching logic module 122 has determined that the first mode of communication is to be used. Accordingly, the switching logic module 122 forwards the intercepted web transaction data 206 to the PCEP system 126, which forwards the web transaction data 206 to a secure gateway service 208 using the intermediate proxy server 204. In turn, the web transaction data 206 is sent by the secure gateway service 208 to the target web server 202 connected to network 210.

In the example shown in FIG. 2, target web server 202 responds by sending its web transaction data 206 over network 210 to the secure gateway service 208. In turn, the secure gateway service 208 forwards the web transaction data 206 to the intermediate proxy server 204 of the PCEP system 126, which forwards the web transaction data 206 of the response to the switching logic module 122. The switching logic module 122 in this embodiment forwards the web transaction data 206 of the response to the web-enabled application 120 thereby completing a request/response transaction between the web-enabled application 120 and the target web server 202.

Figure 3:
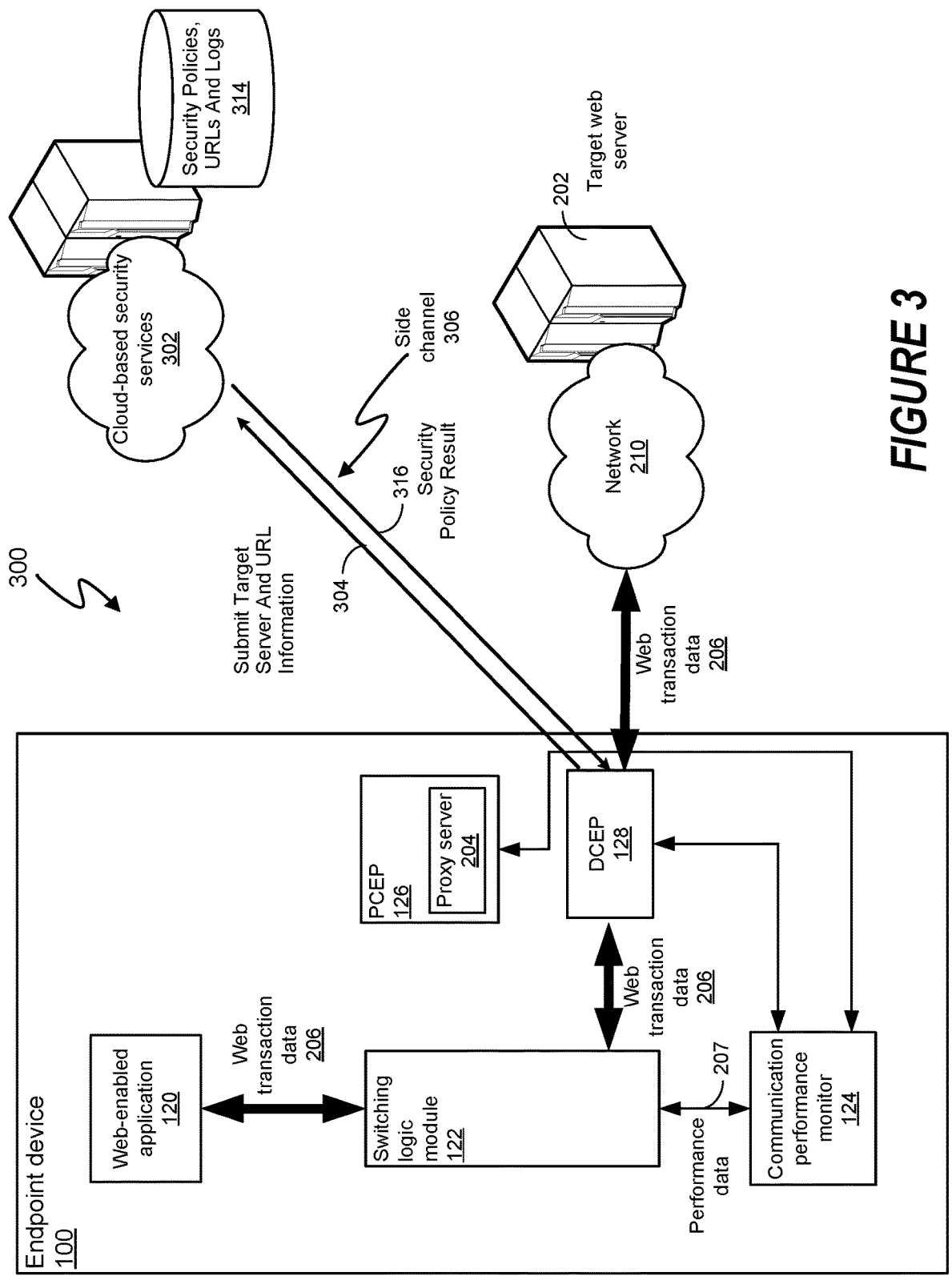
FIG. 3 is a simplified diagram of an electronic environment in which the endpoint device conducts a web transaction with a target web server in a second mode of communication that employs a DCEP system without an intermediate proxy server.

FIG. 3 is a simplified diagram of an electronic environment 300 in which the endpoint device 100 conducts a web transaction with a target web server 202 in a second mode of communication that employs DCEP system 128 without an intermediate proxy server. In this example, a web transaction is initiated by a user using the web-enabled application 120 and involves web transaction data 206 that is used in conducting a web transaction with the target web server 202. Here, the web transaction data 206 is shown as a bidirectional stream where web transaction data 206 intended for the target web server 202 is generated by the web-enabled application 120, and web transaction data 206 intended for the web-enabled application 120 is generated by the target web server 202.

In various embodiments, the DCEP system 128 is implemented to interact with the web-enabled application 120 to extend enforcement of web policy and security controls to roaming users and remote offices that may not have access to a network secured by a proxy server. As used herein, a web-enabled application 120 broadly refers to a software application that includes an ability to communicate with a web server over a network 140. In certain embodiments, the web-enabled application 120 is implemented to use Hypertext Transfer Protocol (HTTP) to communicate information over a network 140. In certain embodiments, the web-enabled application 120 is implemented on an endpoint device 100.

In certain embodiments, the web-enabled application 120 may be implemented to use Secure HTTP (HTTPS) to communicate information over the network 140. In certain embodiments, the web-enabled application 120 may be implemented as a web browser, familiar to skilled practitioners of the art. In certain embodiments, the web-enabled application may be implemented as a mobile device application, likewise familiar to those of skill in the art. In certain embodiments, implementation of the DCEP system number 128 allows geo-localized content to be delivered to the web-enabled application 120 according to the geographical location of an endpoint device 100.

Referring again to FIG. 3, the endpoint device 100 effectively establishes a direct connection to the target web server 202 without accessing an intermediate proxy server. Once the direct-connection is established, the endpoint device 100 submits a request as web transaction data 206, such as a request for content, via the network 210, to the target web server 202. In response, the target web server 202 provides the requested content as web transaction data 206 to the endpoint device 100, where it is received by the DCEP system 128 before ultimately being provided to the web-enabled application 120.

In certain embodiments, the DCEP system 128 establishes a side-channel connection 306 with cloud-based security services 302. Information associated with the web transaction is submitted to the cloud-based security services 302 as submission 304 of the side channel connection 306. The submission 304 may include information, such as the Internet Protocol (IP) address of the target web server 202, Uniform Resource Locator (URL) information associated with the web transaction data 206, or a combination thereof. In response, cloud-based security services 302 processes the submitted information with various information stored in a repository 314 of security policies, URL, and additional configuration information to determine an applicable security policy result 316. In certain embodiments, the security policy result 316 may be a security policy decision. In certain embodiments, the security policy result 316 may be a security policy action. In certain embodiments, the security policy action may be performed by the DCEP system 128.

The resulting security policy result 316 is then provided back to the DCEP system 128, where it is enforced to determine whether to allow the content of the response of the target web server 202 in web transaction data 206 to be provided to the user of the endpoint device 100. In certain embodiments, the security policy result 316 is retained by the DCEP system 128 for future use. As an example, the user of the endpoint device 100 may subsequently attempt to access the same target web server 202 or URL associated with the originally-provided content. In this example, the DCEP system 128 would use the stored security policy result 316 to determine whether to provide the content of the response to the user rather than to repeat the submission of the information associated with the web transaction to the cloud-based security services 302.

In certain embodiments, the submission number three zero four of the target server and URL information, and the resulting provision of an associated security policy result 316 is broadly referred to as a side-channel look-up. In certain embodiments, the submission 304 of the target web server 202 and URL information and security policy enforcement is performed in parallel with the submission of a request for content to the target web server 202 in web transaction data 206 to improve performance and provide a faster web-enabled application 120 experience to the user. In various embodiments, the configuration and operation of the DCEP system 128 is implemented to be agnostic to a particular network 210, endpoint device 100, web-enabled application 120, third party security device, or any combination thereof.

From the foregoing, it will be appreciated that a target web server 202 would see a proxy server's IP address in typical proxy server implementations. In contrast, the target web server 202 sees the endpoint device's 100 public IP address. In various embodiments, the endpoint device's 100 public IP address may be used to provide geographic locality information, such as a physical address, to the target web server 202, which in turn allows the provision of location-based content.

Certain aspects of the present disclosure include an appreciation that current endpoint device security approaches typically involve proxy enforcement and user authentication with the goal of providing seamless security and productivity controls for a user as used in the first communication mode described herein. However, such approaches typically fail to address bypassing third-party filtering and access point implementations, which may hijack proxied traffic via OSI layers L4-L7 interception. Furthermore, such approaches typically do not enforce security policies at the endpoint device 100.

In various embodiments, the DCEP system 128 is implemented to enforce certain security policies without the use of an intermediary proxy server. In certain embodiments, the DCEP system 128 may be further implemented to analyze direct-connect web traffic between an endpoint device 100 and a target web server 202, including URL information and content alike, to derive associated categories and file types. In certain embodiments, the DCEP system 128 may be further implemented to enforce a security policy within the user interface (UI) of the endpoint device 100, display a "blocked content" message as necessary, report locally-filtered transactions to the cloud-based security services 302, or a combination thereof.

In certain embodiments, the web-enabled application 120 may be implemented to use Secure HTTP (HTTPS) to communicate information over the network 210. In certain embodiments, the web-enabled application 120 may be implemented as a web browser, familiar to skilled practitioners of the art. In certain embodiments, the web-enabled application may be implemented as a mobile device application, likewise familiar to those of skill in the art. In certain embodiments, implementation of the DCEP system 128 allows geo-localized content to be delivered to the web-enabled application 120 according to the geographical location of an endpoint device 100.

In certain embodiments, implementation of the DCEP system 128 allows web policy and security controls to be enforced in network environments that are unmanaged, use tunneling protocol (TP) to support a virtual private network (VPN), are complex, or some combination thereof. In certain embodiments, implementation of the DCEP system 128 allows web policy and security controls to be enforced in network environments that use geographic firewalls. In certain embodiments, implementation of the DCEP system 128 allows web policy and security controls to be enforced in network environments that experience changing network conditions. In certain embodiments, implementation of the DCEP system 128 allows web policy and security controls to be enforced in situations where a particular website or web-enabled application 120 does not work well with proxy servers. In certain embodiments, implementation of the DCEP system 128 provides improved performance in the enforcement of web policy and security controls in various network environments.

Figure 4:
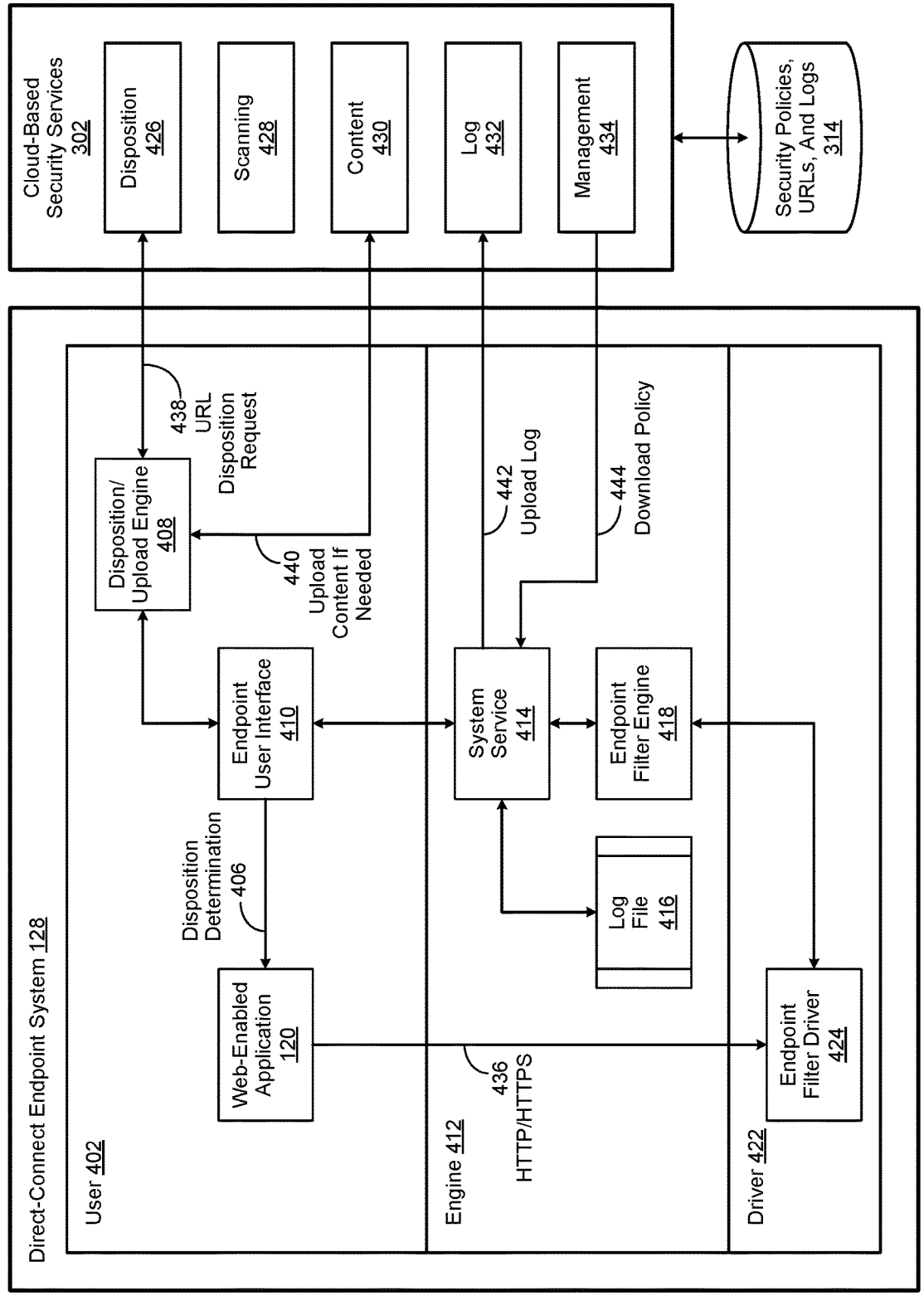
FIG. 4 is a simplified block diagram of a direct-connect endpoint (DCEP) system.

FIG. 4 is a simplified block diagram of a direct-connect endpoint (DCEP) system implemented in accordance with an embodiment of the invention. In this embodiment, a DCEP system 128 is implemented to work in combination with cloud-based security services 302 to enforce a security policy without accessing an intermediate proxy server. As shown in FIG. 4, the DCEP system 128 includes a user component 402, an engine component 412, and a driver component 422. Likewise, the user component 402 includes the web-enabled application 120, a disposition/upload engine 408, and an endpoint user interface (UI) module 410. The engine component 412 likewise includes a system service module 414, an endpoint filter engine 418, and a log file 416, while the driver component 422 includes an endpoint filter driver 424.

As likewise shown in FIG. 4, the cloud-based security services 302 includes a disposition service 426, a scanning service 428, a content service 430, a log service 432, and a management service 434. In certain embodiments, the cloud-based security services 302 are implemented to retrieve and store certain information in a repository 314 of security policies, Uniform Resource Locator (URL), and log data.

In various embodiments, the endpoint UI module 410 may be implemented to provide a visual presentation to the user of an endpoint device 100. As an example, it may be implemented to show a communication mode that the endpoint device 100 is currently using. In certain embodiments, the user component 402 may be implemented to allow a user to enable or disable the DCEP system 128.

In certain embodiments, the user component 402 may be implemented to provide a disposition determination 406, described in greater detail herein, to the web-enabled application 120. As an example, the disposition determination 406 may include a blocked content message. In this example, the web-enabled application 120 may be implemented to display the blocked content message to a user within a UI window. In certain embodiments, the user component 402 may be implemented to receive such a disposition determination 406 from the disposition/upload engine 408.

In certain embodiments, the disposition/upload engine 408 may be implemented to submit URL disposition requests 438 associated with a target server or a URL to the cloud-based security services 302 for disposition determination. As used herein, a disposition broadly refers to an action to be performed in association with a particular web transaction. As likewise used herein, a web transaction broadly refers to a sequence of URLs that are combined to perform an individual, complete process. In various embodiments, the web transaction is the combination of a submitted request and a corresponding response. As an example, the web transaction may include a user of an endpoint device submitting a request for certain content from a target server, and in response, the target server providing the requested content to the user's endpoint device.

In certain embodiments, a URL disposition request 438 may include URL information associated with certain content provided by a particular target server. In certain embodiments, a URL disposition request 438 may include file header information associated with various files contained in certain content provided by a particular target server. In certain embodiments, a URL disposition request 438 may include a combination of URL information and header information associated with various files contained in certain content provided by a particular target server. In certain embodiments, the header information may include web protocol header information.

In certain embodiments, the disposition/upload engine 408 may be implemented to submit URL disposition requests 438 associated with a particular target server, or certain content it may provide, to the disposition service 426 in the cloud-based security services 302 for disposition determination. In certain embodiments, the disposition service 426 may be implemented to perform certain disposition determination operations described in greater detail herein. In certain embodiments, the disposition/upload engine 408 may be implemented to block, allow, or scan a user's request based upon the resulting disposition determination of a particular URL disposition request 438 associated with a particular target server.

In various embodiments, the disposition/upload engine 408 may be implemented to download certain content from a target server to the endpoint device. The disposition/upload engine 408 then uploads 440 the content to the cloud-based security services 302 for examination. In certain embodiments, the disposition/upload engine 408 uploads 440 the content to the content service 430 in the cloud-based security services 302 for examination. In certain embodiments, the disposition/upload engine 408 automatically uploads the content to the cloud-based security services 302 for examination upon its receipt from the target server. In certain embodiments, the disposition/upload engine 408 uploads the content to the cloud-based security services 302 for examination in response to a request from the cloud-based security services 302.

In certain embodiments, the system service module 414 may be implemented to log DCEP system 128 events. In certain embodiments, the system service module 414 may log DCEP system 128 events to a log file 416. In certain embodiments, the system service module 414 may be implemented to upload DECP system 128 events to the log service 432 implemented in the cloud-based security services 302. In certain embodiments, the system service module 414 provides a command-line interface to a user of the DCEP system 128. In certain embodiments, the system service module 414 may be implemented to log various debugging operations and their result. In certain embodiments, the system service module 414 may be implemented to download 444 security policy configuration information from the management service 434 implemented in the cloud-based security services 302. In certain embodiments, the system service module 414 may be implemented to receive disposition determination events from the endpoint UI module 410.

In various embodiments, the endpoint filter engine 418 may be implemented to apply a filter according to a management channel configuration familiar to skilled practitioners of the art. In certain embodiments, the management channel configuration is provided to the endpoint filter driver 424 for application. In certain embodiments, the application of a management channel configuration is provided as a log event to the system service module 414 for logging.

In various embodiments, the endpoint filter driver 424 is implemented to intercept Telecommunications Protocol (TCP) requests from the web-enabled application 120 and determine if such requests are Hypertext Transfer Protocol (HTTP) or Secure HTTP (HTTPS) requests. In certain embodiments, the endpoint filter driver 424 is implemented to apply a filter prior for determining the disposition of an HTTP/HTTPS request 436. As an example, a filter may be applied to ignore certain requests from a particular process. In certain embodiments, the filter is provided by the endpoint filter engine 418.

In various embodiments, the DCEP system 128 may be configured to enforce certain security policies associated with a particular endpoint device, a particular user, or a combination thereof. In certain embodiments, the DCEP system 128 may be configured to query the cloud-based security services 302 for a disposition determination related to enforcement of such security policies. In certain embodiments, the DCEP system 128 may be configured to enforce such security policies locally, as described in greater detail herein. In certain embodiments, the DCEP system 128 may be configured to use the cloud-based security services 302, as described in greater detail herein, to enforce such security policies. In certain embodiments, the DCEP system 128 may be configured to use a combination of local enforcement and the cloud-based security services 302, as described in greater detail herein, to enforce such security policies.

In certain embodiments, the DCEP system 128 may be configured to simply block or allow the provision of content received from a target server according to a disposition determination provided by the disposition service 426. In certain embodiments, the DCEP system 128 may be configured to conditionally block or allow the provision of content received from a target server according to a disposition determination provided by the disposition service 426. In certain embodiments, the DCEP system 128 may be configured to limit the provision of certain content received from a target server according to a disposition determination provided by the disposition service 426.

In certain embodiments, an HTTP request 436 may result in a URL disposition request 438 being submitted to the disposition service 426. In certain embodiments, an HTTPS request 436 may result in a URL disposition request 438 being submitted to the disposition service 426. In certain embodiments, the URL disposition request 438 may result in a "bypass" disposition determination being returned by the disposition service 426. In certain embodiments, the return of such a bypass disposition determination may result in no further security policy operations being performed in relation to the URL disposition request 438.

In various embodiments, the disposition service 426 may be implemented to parse "downstream" headers upon receipt of a URL disposition request 438 to determine associated service, account, and user details. In certain embodiments, the disposition service 426 may be implemented to first parse and decode a URL disposition request 438. Once the URL disposition request 438 is parsed and decoded, the repository 314 of security policies, URLs and logs is accessed to determine if an applicable security policy exists. If so, it is retrieved, along with any associated data. The parsed and decoded URL disposition request 438, along with the retrieved security policy and associated data, is then processed by the disposition service 426 to generate a disposition determination.

In certain embodiments, the resulting disposition determination is provided by the disposition service 426 to the disposition/upload engine 408 of the DCEP system 128. In certain embodiments, the disposition service 426 may return a notification page, such as a page containing a "blocked content" message, to the disposition/upload engine 408 of the DCEP system 128. In certain embodiments, the resulting disposition determination is provided by the disposition service 426 to the log service 432, which then performs a logging operation to store the disposition determination in the repository 314 of security policies, URLs, and logs.

In various embodiments, the management service 434 may be configured to provide certain configuration parameters and other settings to the DCEP system 128. In certain embodiments, these configuration parameters and other settings may be used to affect the operation of the DCEP system 128 when it is enforcing a particular security policy. In certain embodiments, the management service 434 processes a security policy associated with a URL disposition request 438 to generate an object familiar to skilled practitioners of the art. In certain embodiments, the object is generated as a Javascript® Object Notation (JSON) object.

In certain embodiments, the resulting object is processed to generate a hash value. In certain embodiments, the resulting object is processed to generate a Message Digest 5 (MD5) checksum value. In certain embodiments, the resulting MD5 checksum value is used as a tag value. In certain embodiments, the tag value is used to provide content versioning information. In various embodiments, a cache of such objects, identified by their corresponding hash values, is stored in the repository 314 of security policies, URLs, and logs. In certain embodiments, the cache is associated with a single instantiation of cloud-based security services 302. In certain embodiments, the cache is associated with two or more instantiations of cloud-based security services 302.

In certain embodiments, the scanning service 428 may be implemented to scan certain content provided by a target server to determine whether it is suitable for provision to a particular endpoint device, a particular user, or some combination thereof. As an example, the scanning service 428 may scan the content and determine it may contain malware. As another example, the scanning service 428 may scan the content and determine it may contain objectionable, inappropriate, or confidential subject matter. As yet another example, the scanning service 428 may scan the content and determine that it may contain subject matter that is not intended for use by a particular endpoint device, a particular user, or some combination thereof.

In certain embodiments, the DCEP system 128 may be configured to process content received from a target server to generate a corresponding hash value, such as an MD5 checksum value. In certain embodiments, the DCEP system 128 may be configured to provide the resulting hash value as part of a URL disposition request 438 to the disposition service 426. In certain embodiments, the disposition service 426 may be configured to access the repository 314 of security policies, URLs, and logs to see whether a matching hash value exists. If so, the disposition service 426 may be configured to return a previously-determined disposition to the DCEP system 128. If not, the disposition service 426 may be configured to request the content be uploaded 440 to the content service 430.

Once uploaded, the disposition service 426 may be configured to provide the uploaded 340 content to the scanning service 428 to perform content scanning operations familiar to those of skill in the art. The disposition service 426 then processes the results of the scanning operations to generate a disposition determination, which is in turn provided to the DCEP system 128. In certain embodiments, the disposition service may be configured to process the uploaded 340 content to generate a corresponding hash value, which is in turn associated with the URL corresponding to the uploaded 340 content. In certain embodiments, the resulting hash value and its associated URL are stored in the repository 314 of security policies, URLs, and logs for use in future disposition operations performed by the disposition service 426.

Figure 5:
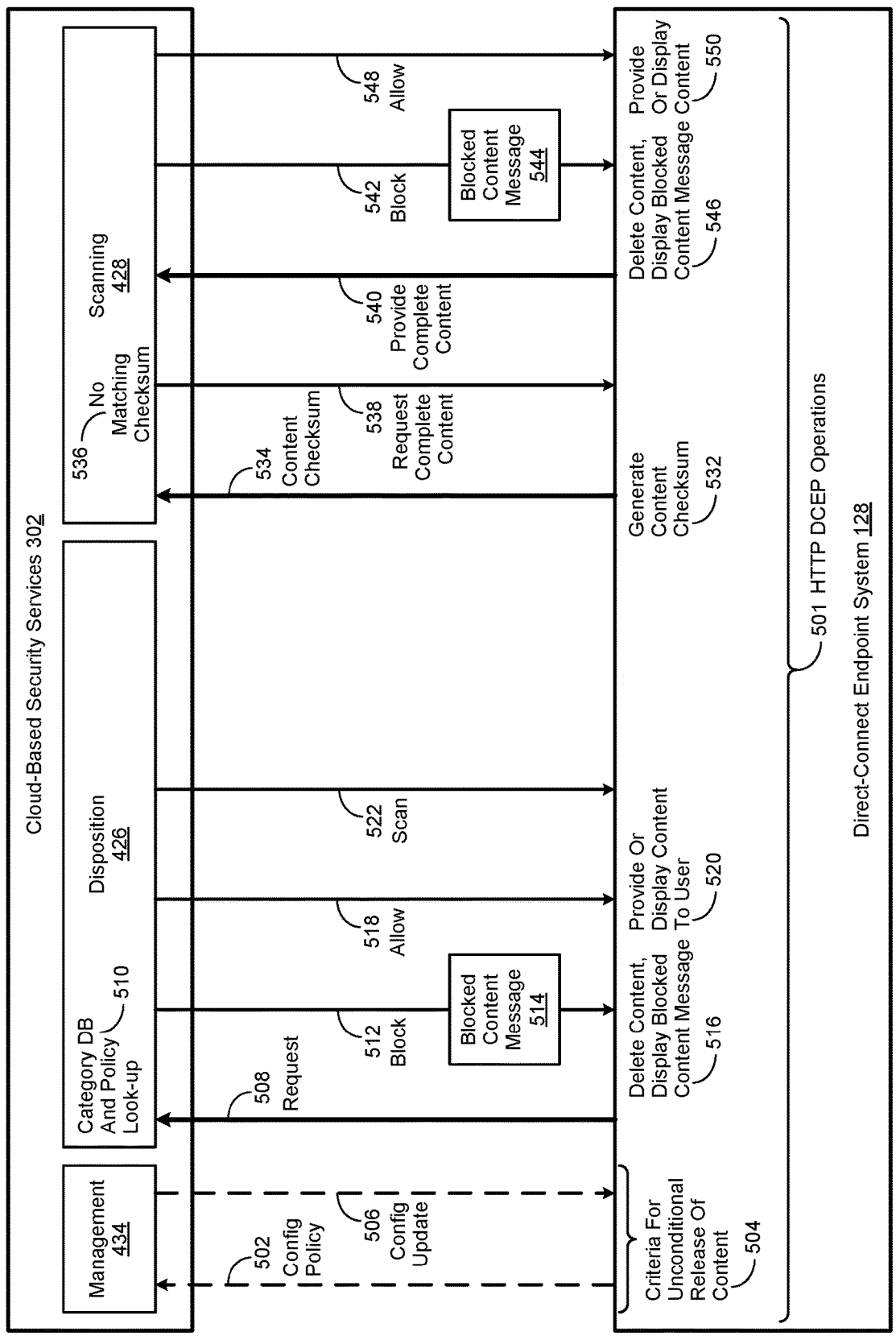
FIG. 5 shows a process flow when Hypertext Transfer Protocol (HTTP) interactions are used in the performance of DCEP system operations.

FIG. 5 shows a process flow implemented in accordance with an embodiment of the invention when Hypertext Transfer Protocol (HTTP) interactions are used in the performance of direct-connect endpoint system (DCEP) operations. In various embodiments, a DCEP system 128 is implemented with cloud-based security services 302 to perform associated HTTP DCEP operations to enforce a security policy. In this embodiment, the DCEP system 128 submits a security policy configuration update request 502 to the cloud-based security services 302, where it is processed by a management service 434, described in greater detail herein. In response, the management service 434 returns a security policy configuration update 506 to the DCEP system 128. In certain embodiments, the security policy configuration update contains criteria 504, parameters, and other data used by the DCEP system 128 to identify content received from a target server that is unconditionally allowed to be provided, or displayed, to a user.

In certain embodiments, the DCEP system 128 is configured to receive content directly from a target server without accessing an intermediate proxy server. Prior to providing or displaying the content to a user, the DCEP system 128 submits a Uniform Resource Locator (URL) and supporting information disposition request 508 to the cloud-based security services 302, where it is received by a disposition service 426, described in greater detail herein. In various embodiments, the supporting information may include metadata associated with a particular user, such as their user identifier (ID), their physical location, the time the request is being made, the default language and version of the user's web-enabled application, and so forth. Those of skill in the art will recognize that many examples of such metadata are possible. Accordingly, the foregoing is not intended to limit the spirit, scope or intent of the disclosure.

Once the URL and supporting information disposition request 508 is received, it is parsed and processed by the disposition service 426, as likewise described in greater detail herein, to generate request data. Once parsing and processing operations have been completed, the resulting request data is used to perform content category database and security policy look-up operations 510. In turn, the results from the content category database and security policy look-up operations 510 and the URL and supporting information disposition request 508 are processed by the disposition service 426 to generate a disposition determination.

In certain embodiments, the resulting disposition determination is to block 512 certain content received from a particular target server from being provided or displayed to a user. In this embodiment, a blocked content message 514 may be generated, which in turn is provided to the DCEP system 128. In certain embodiments, a disposition determination to block 512 certain content results in the DCEP system 128 deleting the corresponding content received from the target server, displaying the blocked content message 516 to the user, or a combination thereof. In certain embodiments, the resulting disposition determination is to allow 518 certain content received from a target server to be provided or displayed to a user. In this embodiment, the corresponding content is provided or displayed to the user.

In various embodiments, the resulting disposition determination is to scan 522 certain content received from a target server before a disposition determination is generated. In certain embodiments, file and protocol header information contained in the information disposition request 508 is provided to the scanning service 428, where it is used to perform scanning operations. In certain embodiments, the file and protocol header information and the previously-parsed disposition data is processed to determine whether one or more security policies are applicable to certain content received from a particular target server.

In certain embodiments, the DCEP system 128 may be implemented to process certain content received from a particular target server to generate an associated checksum value 532, which is then provided 534 to the scanning service 428. In certain embodiments, the scanning service 428 may be implemented to process the provided 534 checksum value 532 to determine whether there is a matching checksum value stored in a repository of security policies, URLs, and logs. In certain embodiments, the repository of security policies, URLs, and logs may be implemented to store previously-scanned content associated with an entity, their associated URL(s), and their corresponding content checksum values in a URL cache familiar to those of skill in the art.

In certain embodiments, a determination is made that no matching checksum value 536 was found in the repository of security policies, URLs, and logs. As a result, the scanning service 428 submits a request 538 to the DCEP system 128 requesting provision of the content corresponding to the previously-generated checksum value 532. In response, the DCEP system 128 provides the content 540 corresponding to the scanning service 428. In turn, the scanning service 428 scans the provided content 540 and generates an associated disposition determination. The method by which the scanning service 428 scans the provided content 540, and the method by which the disposition determination is generated, is a matter of design choice.

In certain embodiments, the resulting disposition determination is to block 542 the content from being provided or displayed to a user. In this embodiment, a blocked content message 544 is generated, which in turn is provided to the DCEP system 128. In certain embodiments, a disposition determination to block 542 the content results in the DCEP system 128 deleting the corresponding content received from the target server, displaying the blocked content message 546 to the user, or a combination thereof. In certain embodiments, the resulting disposition determination is to allow 548 the content to be provided or displayed to a user. In this embodiment, the corresponding content is then provided or displayed 550 to the user.

Figure 6:
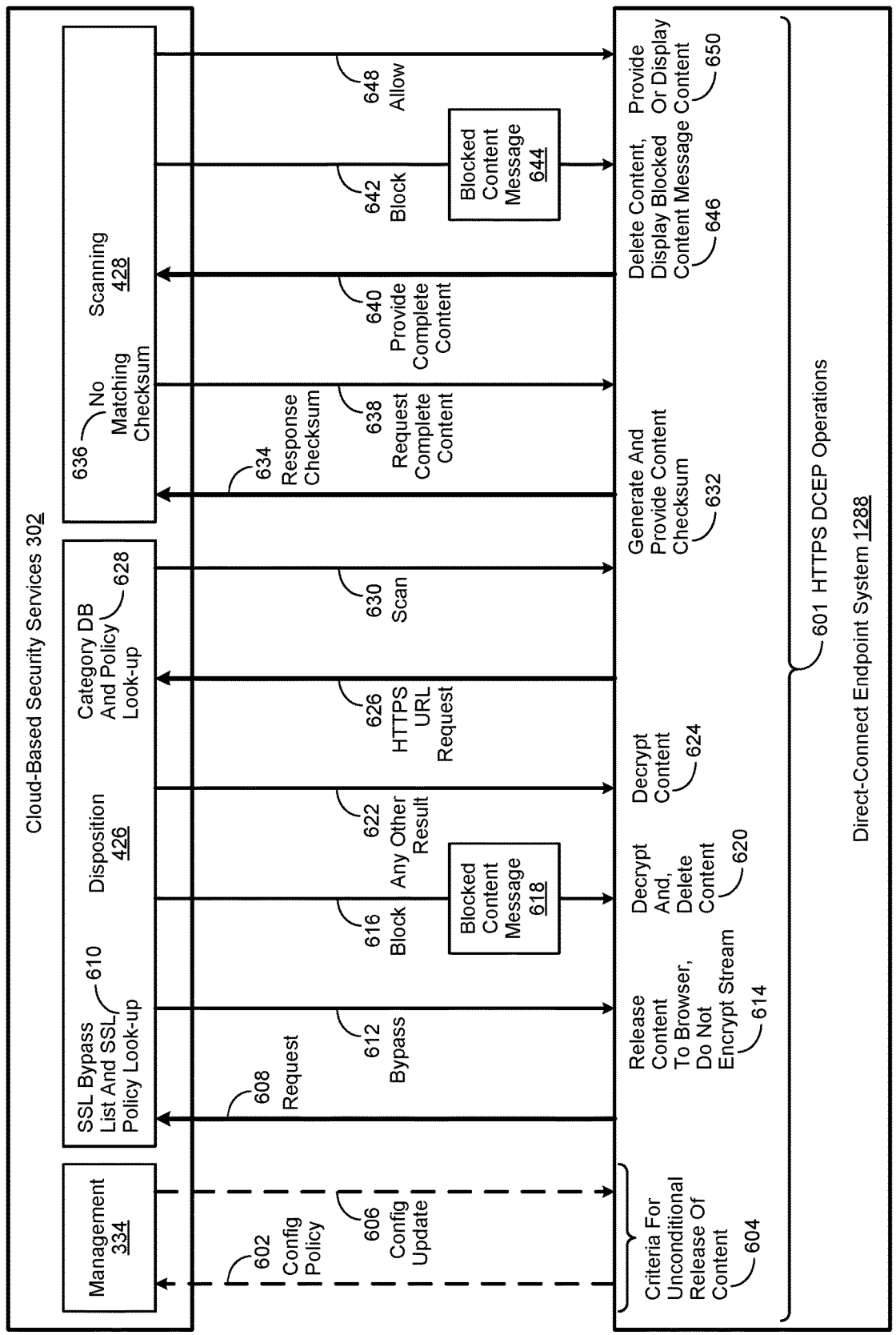
FIG. 6 shows a process when Secure HTTP (HTTPS) interactions are used in the performance of DCEP system operations.

FIG. 6 shows a process flow implemented in accordance with an embodiment of the invention when Secure Hypertext Transfer Protocol (HTTPS) interactions are used in the performance of direct-connect endpoint (DCEP) system operations. In various embodiments, a DCEP system 128 is implemented with cloud-based security services 302 to perform associated HTTPS DCEP operations to enforce a security policy. In this embodiment, the DCEP system 128 submits a security policy configuration update request 602 to the cloud-based security services 302, where it is processed by a management service 434, described in greater detail herein. In response, the management service 434 returns a security policy configuration update 606 to the DCEP system 128. In certain embodiments, the security policy configuration update contains criteria 604, parameters and other data used by the DCEP system 128 to identify content received from a target server that is unconditionally allowed to be provided or displayed to a user.

In certain embodiments, the DCEP system 128 is configured to receive content directly from a target server without accessing an intermediate proxy server. Prior to providing or displaying the content to a user, the DCEP system 128 submits a Uniform Resource Locator (URL) disposition request 608 to the cloud-based security services 302, where it is received by a disposition service 426. Once the URL disposition request 608 is received, it is parsed and processed by the disposition service 426, as likewise described in greater detail herein, to generate disposition data. Once parsing and processing operations have been completed, the resulting disposition data is used to perform Secure Socket Layer (SSL) bypass list and SSL security policy look-up operations 510. In turn, the results from the SSL bypass list and SSL security policy look-up 610 and the URL disposition request 608 are processed by the disposition service 426 to generate a disposition determination.

In certain embodiments, the resulting disposition determination is to bypass 612 SSL encryption of the content provided by the target server. In this embodiment, the content provided by the target server is encrypted with the SSL protocol and is not decrypted until it has been allowed, or released, for provision or display to the user. In certain embodiments, the resulting disposition determination is to block 616 certain content received from a target server from being provided or displayed to a user. In this embodiment, a blocked content message 618 may be generated, which in turn is provided to the DCEP system 128. In certain embodiments, a disposition determination to block 616 certain content results in the content provided by a target server being decrypted and then deleted 620. In certain embodiments, the resulting disposition determination is for any disposition determination that is to not bypass 612 or to block 616 the content received from a target server. In this embodiment, the content received from a particular target server is then decrypted 624.

In various embodiments, the DCEP system 128 is implemented to submit an HTTPS URL disposition request 626 to the cloud-based security services 302, where it is received by a disposition service 426, described in greater detail herein. Once the HTTPS URL disposition request 626 is received, it is parsed and processed by the disposition service 426, as likewise described in greater detail herein, to generate disposition data. Once parsing and processing operations have been completed, the resulting disposition data is used to perform content category database and security policy look-up operations 628. In turn, the results from the content category database and security policy look-up operations 628 and the HTTPS URL disposition request 626 are processed by the disposition service 426 to generate a disposition determination.

In certain embodiments, the resulting disposition determination is to scan 630 certain content received from a target server before a disposition determination is generated. In certain embodiments, file and protocol header information contained in the URL disposition request 608 is provided to the scanning service 428, where it is used to perform scanning operations. In certain embodiments, the file and protocol header information and the previously-parsed disposition data are processed to determine whether one or more security policies are applicable to certain content received from a particular target server.

In certain embodiments, the DCEP system 128 may be implemented to process certain content received from a particular target server to generate an associated checksum value 632, which is then provided 634 to the scanning service 428. In certain embodiments, the scanning service 428 may be implemented to process the provided 634 checksum value 632 to determine whether there is a matching checksum value stored in a repository of security policies, URLs, and logs. In certain embodiments, the repository of security policies, URLs, and logs may be implemented to store URL and content checksum values in a URL cache familiar to those of skill in the art.

In certain embodiments, it is determined that no matching checksum 636 was found in the repository of security policies, URLs, and logs. As a result, the scanning service 428 submits a request 638 to the DCEP system 128 requesting provision of the content corresponding to the previously-generated checksum 632. In response, the DCEP system 128 system provides the content 540 corresponding to the scanning service 428. In turn, the scanning service 428 scans the provided 640 content and generates an associated disposition determination. The method by which the scanning service 428 scans the provided 640 content, and the method by which the disposition determination is generated, is a matter of design choice.

In certain embodiments, the resulting disposition determination is to block 642 the content from being provided or displayed to a user. In this embodiment, a blocked content message 644 may be generated, which in turn is provided to the DCEP system 128. In certain embodiments, a disposition determination to block 642 the content results in the DCEP system 128 deleting the corresponding content received from the target server, displaying the blocked content message 646 to the user, or a combination thereof. In certain embodiments, the resulting disposition determination is to allow 648 the content to be provided or displayed to a user. In this embodiment, the corresponding content is then provided or displayed to the user 650.

Figure 7:
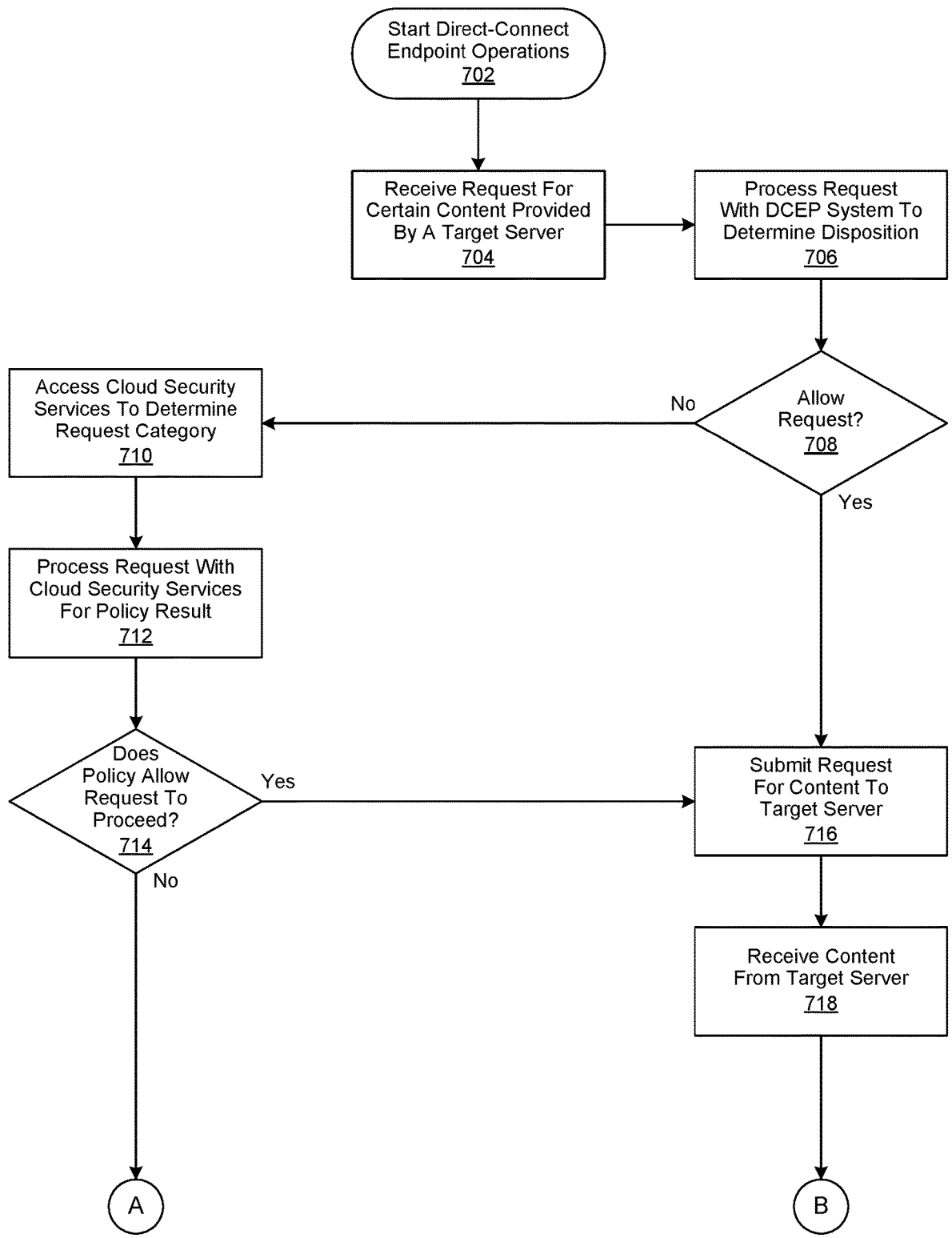

FIG. 7 graphically depicts a direct-connect endpoint (DCEP) system implemented in accordance with an embodiment of the invention to enforce a cloud-based security policy. In various embodiments, a DCEP system 128 is implemented in combination with a web-enabled application 120, as described in greater detail herein, to enforce 742 a cloud-based security policy associated with a user of the endpoint device 100, an endpoint device 100 itself, or a combination thereof. In this embodiment, the user of the endpoint device 100 uses the web-enabled application 120 to perform search and browse 734 operations in a network 140 environment, resulting in the submission of a request 738 for certain content residing on a target web server 202. In response, the target web server 202 provides 740 the requested content to the endpoint device, 100, where it is intercepted by the DCEP system 128.

Figure 8:
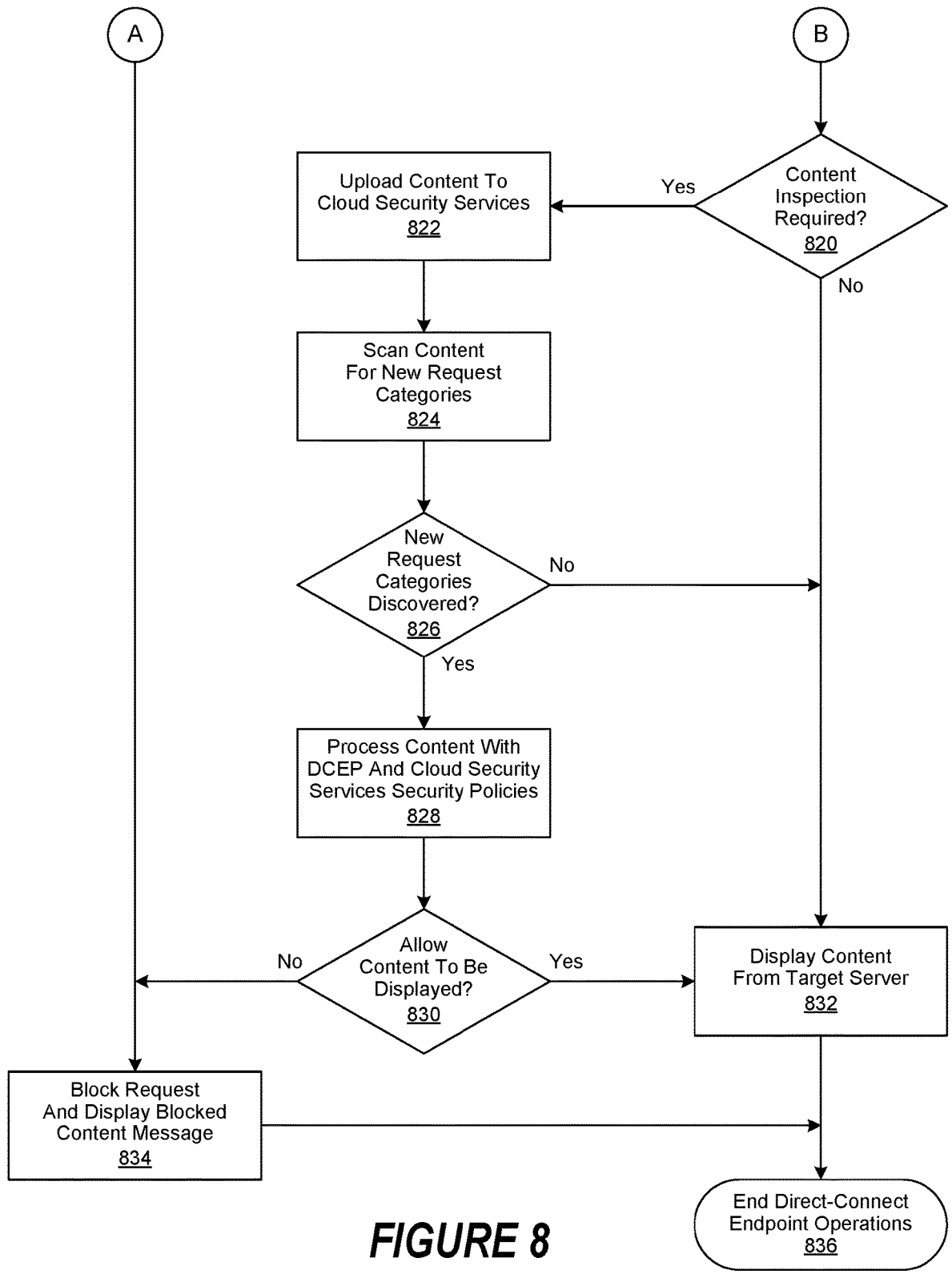
FIG. 8 and FIG. 9 are a generalized flowchart of the operations that may be executed in certain embodiments of a DCEP system.

FIGS. 7 and 8 are a generalized flowchart of the performance of direct-connect endpoint system operations to provide endpoint security. In this embodiment, direct-connect endpoint (DCEP) system operations are begun in step 702, followed by the receipt of a request in step 704 for certain content provided by a particular target server. The request is then processed by the DCEP system in step 706 to determine the disposition of the request. In various embodiments, as described in greater detail herein, the DCEP system may use a simplified, user-specific security policy to determine the disposition of the request.

Based upon the disposition determined in step 706, a determination is then made in step 708 whether to allow the request to proceed. If not, then cloud-based security services are accessed in step 710 to determine a category for the request. In certain embodiments, the request is provided to the cloud-based security services as a Uniform Resource Locator (URL) and supporting information disposition request, described in greater detail herein. Once received, the URL and supporting information disposition request is processed by the cloud-based security services in step 712, as likewise described in greater detail herein, to determine a security policy result.

A determination is then made in step 714 whether the resulting security policy result allows the request to proceed. If so, or if it was determined in step 708 to allow the request to proceed, then the request for content is submitted to the target server in step 716. In response, the requested content is received from the target server in step 718. A determination is then made in step 720 whether the provided content requires inspection. If so, then the provided content is uploaded to the cloud-based security services in step 718, where it is scanned in step 824 for new request categories.

A determination is then made in step 826 whether new request categories were discovered. If so, then the content is processed with both the simplified, user-specific and cloud-based security policies in step 828. A determination is then made in step 830 whether to allow the provision or display of the content to the user. If not, or if it was determined in step 714 that the security policy does not allow the request to proceed, then the request is blocked and a blocked content message is displayed to the user in step 834. Otherwise, or if it was respectively determined in step 720 that no content inspection was required, or in step 826 that no new request categories were discovered, then the content provided by the target server is provided, or displayed, to the user in step 832. Thereafter, or once the request is blocked and a blocked content message is displayed to the user in step 834, DCEP system operations are ended in step 836.

Figure 9:
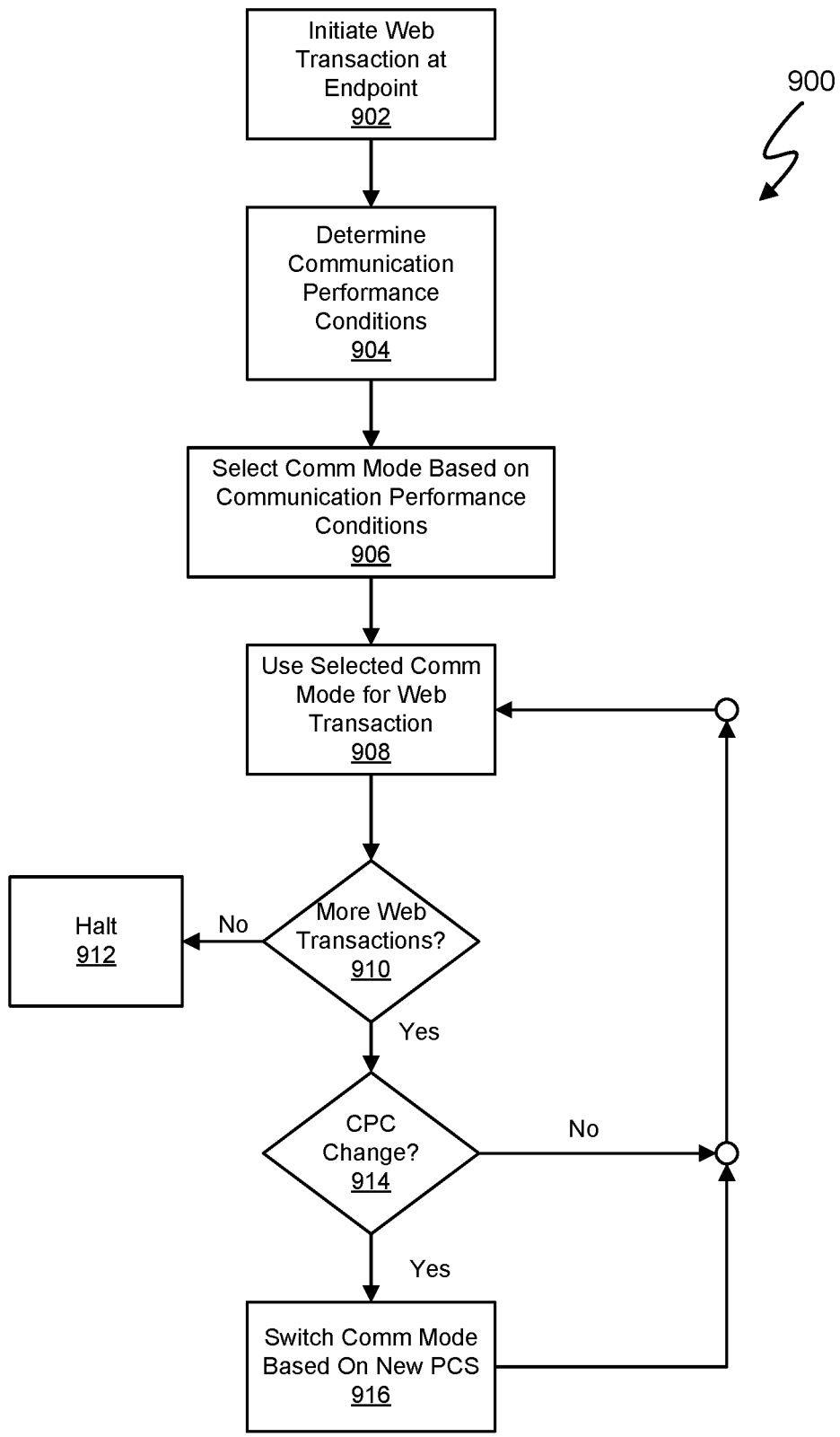

FIG. 9 is a flowchart 900 showing exemplary operations that may be executed in certain embodiments of the disclosed system. In this example, a web transaction is initiated at the endpoint device at operation 902, and the communication performance conditions associated with the web transaction that is to be conducted is determined at operation 904 (e.g., whether a communication mode using an intermediate proxy or a communication mode that does not use an intermediate proxy is to be employed by the endpoint device). A selection as to which communication mode will be used at the endpoint device for the web transaction is determined at operation 906 based on the performance condition status determined at operation 904. At operation 908, the selected communication mode is used to execute the web transaction.

The communication performance conditions that may be used as a basis for the initial selection of the communication mode and/or the switching between the communication modes are varied. In certain embodiments, the communication performance conditions include one or more of 1) a change in availability of a network used in the web transaction, 2) whether the endpoint device is using a virtual private network for communication with the target web server, 3) the network communication speed between the endpoint device and the target web server, 4) the communication latency between the endpoint device and the target web server, 5) a quality of service condition of the communications between the endpoint device and the target web server, 6) the network communication speed between the endpoint device and a secured web gateway server, 7) the communication latency between the endpoint device and the secured web gateway server, and 8) a quality of service condition of the communications between the endpoint device and the secured web gateway server. Based on the teachings of the present disclosure, it will be recognized that other communication performance conditions may also be employed in communication mode determinations.

At operation 910, a determination is made as to whether there are more web transactions that are to be conducted with the target web server. If no further web transactions are needed, the system may halt the operations shown in FIG. 9 at operation 912 until such time as more web transactions are to be conducted.

If more web transactions are to be conducted, a determination may be made at operation 914 as to whether the communication performance conditions have changed to a significant degree so as to warrant a switch of the communication mode used by the endpoint device. If a change in the communication mode is not warranted at operation 914, the currently active communication mode is used for the web transaction at operation 908. Otherwise, if the communication performance conditions now warrant a switch to another communication mode, the communication mode is switched to another communication mode at operation 916. For example, the communication mode may be switched between the communication mode that uses an intermediate proxy to the communication mode that does not use an intermediate proxy, and vice-versa.

Figure 10:
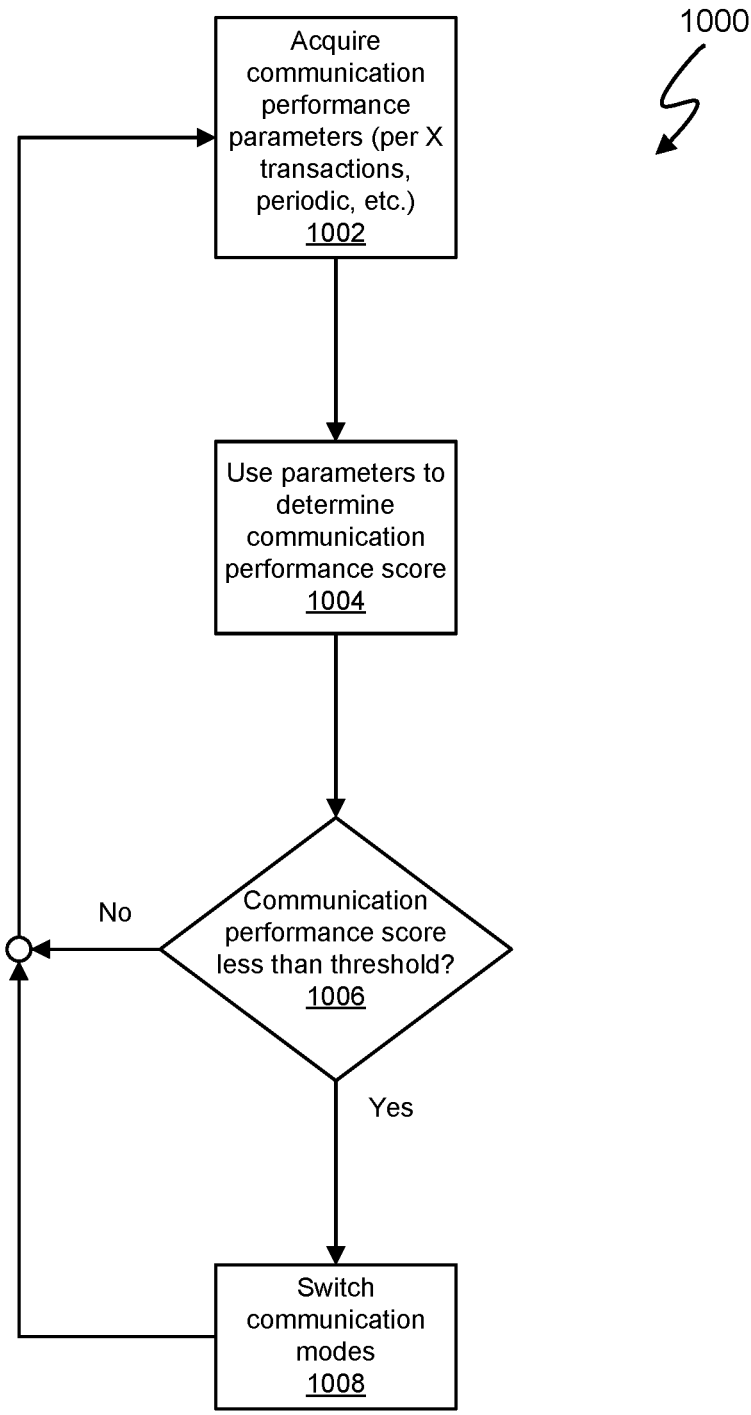
FIG. 10 is a flowchart showing exemplary operations that may be used to switch communication modes in certain embodiments of the disclosed system.

FIG. 10 is a flowchart 1000 showing exemplary operations that may be used to switch communication modes in certain embodiments of the disclosed system. In this example, the communication performance parameters are acquired at operation 1002. In certain embodiments, the communication performance parameters are acquired after a predetermined number of web transactions have occurred. In certain embodiments, the communication performance parameters are acquired on a periodic basis. Other criteria may also be used to determine when the communication performance parameters are to be acquired at operation 1002.

In certain embodiments, the communication performance parameters include 1) the availability of a network used in the web transaction, 2) whether the endpoint device is using a virtual private network for communication with the target web server, 3) the network communication speed between the endpoint device and the target web server, 4) the communication latency between the endpoint device and the target web server, 5) a quality of service condition of the communications between the endpoint device and the target web server, 6) the network communication speed between the endpoint device and a secured web gateway server, 7) the communication latency between the endpoint device and the secured web gateway server, and 8) a quality of service condition of the communications between the endpoint device and the secured web gateway server.

In certain embodiments, the communication performance parameters are used to determine a communication performance score at operation 1004. In certain embodiments, the communication performance parameters may be subject to a scaling, weighting, normalization, or other operation pursuant to generating the communication performance score. In certain embodiments, the communication performance score is determined using a weighted sum of the scale and/or normalized parameters. It will be recognized based on the teachings of the present disclosure that other manners of using the communication performance parameters to arrive at a communication performance score may also be used.

Once the communication performance score has been determined, the score is compared to a communication performance score threshold at operation 1006. If the communication performance score is less than the threshold, the communication mode used by the endpoint device is switched at operation 1008. Otherwise, the endpoint device may continue to use the current communication mode to execute web transactions until such time as the communication performance score falls below the threshold.

Figure 11:
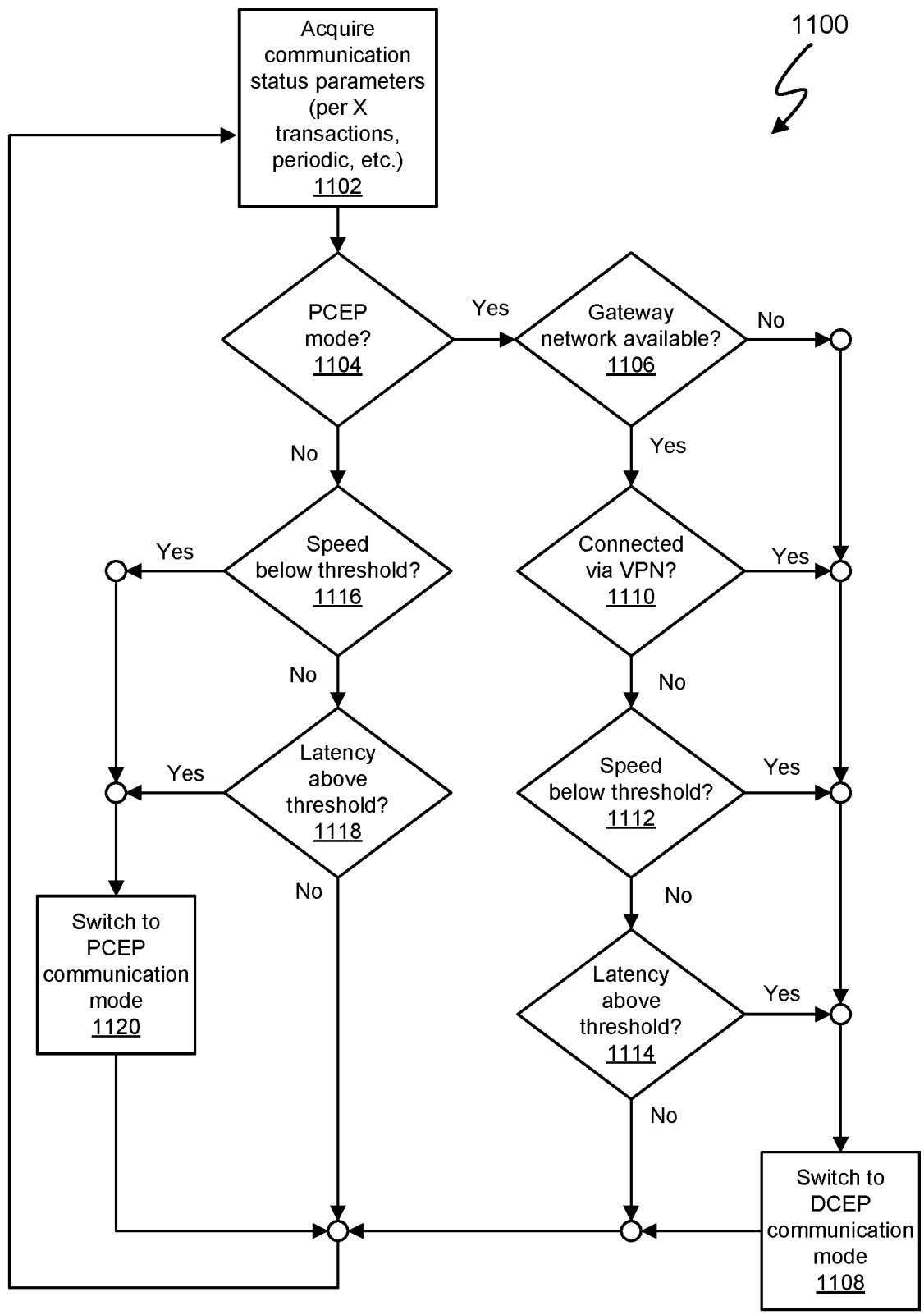
FIG. 11 is a flowchart showing exemplary operations that may be used to switch communication modes in certain embodiments of the disclosed system.

FIG. 11 is a flowchart 1100 showing exemplary operations that may be used to switch communication modes in certain embodiments of the disclosed system. In this example, the communication performance parameters are acquired at operation 1102. In certain embodiments, the communication performance parameters are acquired after a predetermined number of web transactions have occurred. In certain embodiments, the communication performance parameters are acquired on a periodic basis. Other criterion may also be used to determine when the communication performance parameters are to be acquired at operation 1102.

In the example shown in FIG. 11, the communication parameters acquired at operation 1102 are compared to respective thresholds in determining whether to switch between a PCEP communication mode or a DCEP communication mode. In certain embodiments, a determination is made at operation 1104 as to whether the endpoint device is currently operating in the PCEP mode. If operating in the PCEP, a determination is made as to whether a connection is available to the secured gateway server at operation 1106. If a connection to the gateway network service is not available, the communication mode of the endpoint device is switched to the DCEP communication mode at operation 1108. Otherwise, a determination is made at operation 1110 as to whether the endpoint device is connected via a virtual private network (VPN).

If it is determined that the endpoint device is connected via a VPN, the communication mode of the endpoint device may be switched to the DCEP communication mode at operation 1108. The switch to the DCEP communication mode may be warranted in such instances since proxied connections using a VPN may result in substandard communication performance. Otherwise, a determination is made at operation 1112 as to whether the communication speed in the PCEP communication mode is below a threshold.

If it is determined that the communication speed in the PCEP communication mode is below the threshold, the communication mode of the endpoint device may be switched to the DCEP communication mode at operation 1108. Otherwise, a determination is made at operation 1114 as to whether the communication latency in the PCEP mode is above a threshold.

If it is determined that the latency in the PCEP communication mode is above the threshold, the communication mode of the endpoint device may be switched to the DCEP communication mode at operation 1108. Otherwise, the endpoint device continues to conduct web transactions in the PCEP communication mode, and the communication status parameters are again acquired at operation 1102 as per the acquisition criterion.

If the endpoint device is not operating in the PCEP communication mode, then it is operating in the DCEP communication mode. In this example, a determination is made at operation 1116 as to whether the communication speed in the DCEP communication mode is below a threshold. If it is determined that the communication speed in the DCEP communication mode is below the threshold, the communication mode of the endpoint device may be switched to the PCEP communication mode at operation 1120. Otherwise, a determination is made at operation 1118 as to whether the communication latency in the DCEP communication mode is above a threshold.

If it is determined that the communication latency in the DCEP communication mode is above the threshold, the communication mode of the endpoint device may be switched to the PCEP communication mode at operation 1120. Otherwise, the endpoint device continues to conduct web transactions in the DCEP communication mode, and the communication status parameters are again acquired at operation 1102 as per the acquisition criterion.

The communication status parameters used in the example shown in FIG. 11 are merely exemplary. It will be recognized based on the teachings of the present disclosure that other communication status parameters may also be employed and compared to respective thresholds to determine whether a switch in communication modes is warranted.

Figure 12:
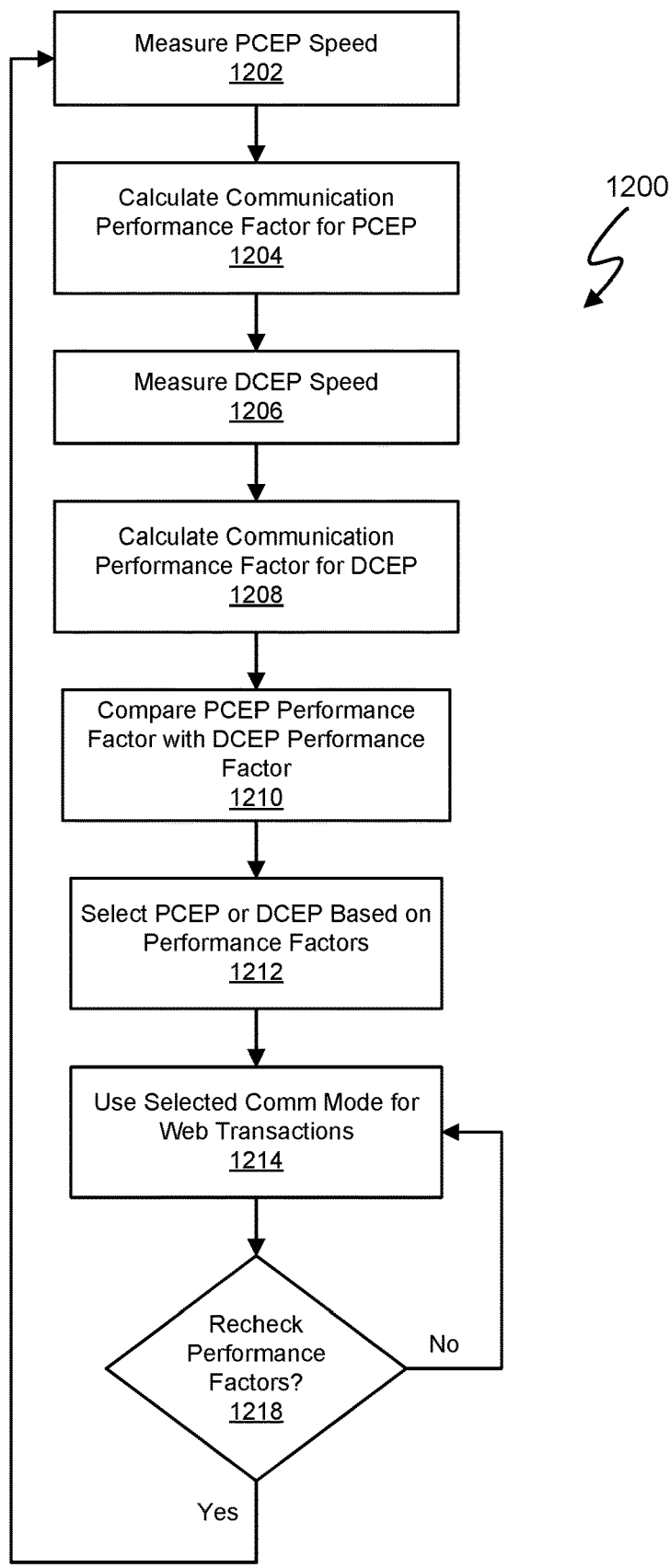
FIG. 12 is a flowchart depicting exemplary operations that may be executed pursuant to selecting and/or switching between a DCEP communication mode or PCEP communication mode for conducting web transactions.

FIG. 12 is a flowchart 1200 depicting exemplary operations that may be executed pursuant to selecting and/or switching between a DCEP communication mode or PCEP communication mode for conducting web transactions. In this example, measurements to determine the speed of communications in the PCEP mode are conducted at operation 1202, and used to calculate a performance factor for the PCEP mode at operation 1204. In certain embodiments, measurements to determine the speed of communications in the DCEP mode are conducted at operation 1206, and used to calculate a performance factor for the DCEP mode at operation 1208. In certain embodiments, the calculations used to determine the PCEP performance factor at operation 1204 and DCEP performance vector at operation 1208 are the same in that the same function is used to determine both the DCEP performance factor and DCEP performance vector using the same measured communication parameters and weighting factors. Alternatively, the calculations used to determine the PCEP performance factor at operation 1204 and DCEP performance vector at operation 1208 may be different in that different measurement parameters and/or weighting factors are used in their determination.

At operation 1212, the performance factors for the PCEP and DCEP modes are compared with one another. At operation 1212, a selection is made as to which communication mode will be used to conduct web transactions. In certain embodiments, the communication mode is selected based on which communication mode has the better performance factor. In certain embodiments, the communication mode is selected based on a weighted comparison of the performance factors. As an example, if the PCEP mode is a predetermined factor slower than the DCEP mode (e.g., eight-times slower, or other desired value), communications will switch to the DCEP mode. Similarly, if the PCEP mode is less than a predetermined factor slower (e.g., PCEP mode is less than eight-times slower than the DCEP mode, or other desired value), communications will switch to the PCEP mode. In certain embodiments, if communications fail in the DCEP mode, the system may opt to fail all traffic, pass all traffic, or utilize stored rules to control traffic.

As will be appreciated by one skilled in the art, the present invention may be embodied as a method, system, or computer program product. Accordingly, embodiments of the invention may be implemented entirely in hardware, entirely in software (including firmware, resident software, microcode, etc.), or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++, or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method comprising:
    initiating a web transaction between an endpoint device and a target web server, the endpoint device comprising a switching logic module, a communication performance monitor, a proxy connected endpoint system and a direct-connect endpoint system, the proxy connected endpoint system comprising an intermediate proxy server, the web transaction being subject to security policies respectively implemented at the proxy connected endpoint system and the direct-connect endpoint system;
    monitoring, via the communication performance monitor, one or more communication performance conditions associated with conducting the web transaction;
    automatically switching, via the switching logic module, between a first communication mode and a second communication mode in response to the one or more communication performance conditions associated with conducting the web transaction, wherein
        the endpoint device communicates with the target web server using the intermediate proxy server of the proxy connected endpoint system in the first communication mode; and
        the endpoint device communicates with the target web server without using the intermediate proxy server in the second communication mode, when communicating in the second communication mode, the endpoint device communicating with the target web server via the direct-connect endpoint system.

2. The computer-implement method of claim 1, wherein the communication performance conditions include one or more network communication performance conditions including:
    a change in availability of a network used in the web transaction;
    whether the endpoint device is using a virtual private network for communication with the target web server;
    network communication speed between the endpoint device and the target web server;
    communication latency between the endpoint device and the target web server;
    a quality of service condition of the communications between the endpoint device and the target web server;
    network communication speed between the endpoint device and a secured web gateway server;
    communication latency between the endpoint device and the secured web gateway server; and
    a quality of service condition of the communications between the endpoint device and the secured web gateway server.

3. The computer-implemented method of claim 2, wherein the endpoint device automatically switches to the second communication mode under one or more conditions, including:
    the network used in the web transaction in the first communication mode is no longer available;
    the endpoint device is using a virtual private network for communication with the target web server;
    the network communication speed between the endpoint device and the target web server falls below a threshold; or
    the quality of service of communications between the endpoint device and the target web server falls below a threshold.

4. The computer-implemented method of claim 1, wherein the second communication mode includes
    establishing a side channel to a security service when the endpoint device initiates the web transaction with a web-enabled application; and
    using the side channel to enforce a security policy at the endpoint device, wherein the security policy is stored at the security service.

5. The computer-implemented method of claim 1, further comprising:
    generating data at a web-enabled application at the endpoint device for communication to the target web server;
    intercepting the data from the web-enabled application at a switching logic module;
    determining a status of the one or more communication performance conditions;
    in response to determining that the one or more communication performance conditions indicate use of the first communication mode,
        forwarding the intercepted data from the switching logic module to the proxy server for communication to the target web server; and
    in response to determining that the one or more communication performance conditions indicate use of the second communication mode.

6. The computer-implemented method of claim 5, further comprising:
    in response to determining that the one or more communication performance conditions
    indicate use of the second communication mode,
        establishing a side channel to a security service,
        receiving a security policy from the security service at the endpoint device over the side channel, and
        enforcing the security policy at the endpoint device to control communications between the endpoint device and the target web server.

7. The computer-implemented method of claim 6, further comprising:
    selectively forwarding the intercepted data from the switching logic module to the target web server based on the security policy enforced at the endpoint device.

8. A system comprising:
    one or more processing units each including
        one or more processors,
        memory coupled to the one or more processors, wherein the memory stores program instructions executable by the one or more processors,
    the one or more processing units, alone or in combination with one another, execute the program instructions to perform a method comprising:
        initiating a web transaction between an endpoint device and a target web server, the endpoint device comprising a switching logic module, a communication performance monitor, a proxy connected endpoint system and a direct-connect endpoint system, the proxy connected endpoint system comprising an intermediate proxy server, the web transaction being subject to security policies respectively implemented at the proxy connected endpoint system and the direct-connect endpoint system;
monitoring, via the communication performance monitor, one or more communication performance conditions associated with conducting the web transaction;
automatically switching, via the switching logic module, between a first communication mode and a second communication mode in response to the one or more communication performance conditions associated with conducting the web transaction, wherein
the endpoint device communicates with the target web server using the intermediate proxy server of the proxy connected endpoint system in the first communication mode; and
the endpoint device communicates with the target web server without using the intermediate proxy server in the second communication mode, when communicating in the second communication mode, the endpoint device communicating with the target web server via the direct-connect endpoint system.

9. The system of claim 8, wherein the communication performance conditions include one or more network communication performance conditions including:
a change in availability of a network used in the web transaction;
whether the endpoint device is using a virtual private network for communication with the target web server;
network communication speed between the endpoint device and the target web server;
communication latency between the endpoint device and the target web server;
a quality of service condition of the communications between the endpoint device and the target web server;
network communication speed between the endpoint device and a secured web gateway server;
communication latency between the endpoint device and the secured web gateway server; and
a quality of service condition of the communications between the endpoint device and the secured web gateway server.

10. The system of claim 9, wherein the endpoint device automatically switches to the second communication mode under one or more conditions, including:
the network used in the web transaction in the first communication mode is no longer available;
the endpoint device is using a virtual private network for communication with the target web server;
the network communication speed between the endpoint device and the target web server falls below a threshold; and
the quality of service of communications between the endpoint device and the target web server falls below a threshold.

11. The system of claim 8, wherein
the second communication mode includes
establishing a side channel to a security service when the endpoint device initiates the web transaction with a web-enabled application; and
using the side channel to enforce a security policy at the endpoint device, wherein the security policy is stored at the security service.

12. The system of claim 8, wherein the method further comprises:
generating data at a web-enabled application at the endpoint device for communication to the target web server;
intercepting the data from the web-enabled application at a switching logic module;
determining a status of the one or more communication performance conditions;
in response to determining that the one or more communication performance conditions indicate use of the first communication mode,
forwarding the intercepted data from the switching logic module to the proxy server for communication to the target web server; and
in response to determining that the one or more communication performance conditions indicate use of the second communication mode,
forwarding the intercepted data from the switching logic module to the target web server, wherein the forwarded data from the switching logic module bypasses the proxy server.

13. The system of claim 12, wherein the method further comprises:
in response to determining that the one or more communication performance conditions indicate use of the second communication mode,
establishing a side channel to a security service,
receiving a security policy from the security service at the endpoint device over the side channel;
enforcing the security policy at the endpoint device to control communications between the endpoint device and the target web server.

14. The system of claim 13, wherein the method further comprises:
selectively forwarding the intercepted data from the switching logic module to the target web server based on the security policy enforced at the endpoint device.

15. A non-transitory, computer-readable storage medium embodying computer program code, the computer program code comprising computer-executable instructions configured for:
initiating a web transaction between an endpoint device and a target web server, the endpoint device comprising a switching logic module, a communication performance monitor, a proxy connected endpoint system and a direct-connect endpoint system, the proxy connected endpoint system comprising an intermediate proxy server, the web transaction being subject to security policies respectively implemented at the proxy connected endpoint system and the direct-connect endpoint system;
monitoring, via the communication performance monitor, one or more communication performance conditions associated with conducting the web transaction;
automatically switching, via the switching logic module, between a first communication mode and a second communication mode in response to the one or more communication performance conditions associated with conducting the web transaction, wherein
the endpoint device communicates with the target web server using the intermediate proxy server of the proxy connected endpoint system in the first communication mode; and
the endpoint device communicates with the target web server without using the intermediate proxy server in the second communication mode, when communicating in the second communication mode, the endpoint device communicating with the target web server via the direct-connect endpoint system.

16. The non-transitory, computer-readable storage medium of claim 15, wherein the communication performance conditions include one or more network communication performance conditions including:
 a change in availability of a network used in the web transaction;
 whether the endpoint device is using a virtual private network for communication with the target web server;
 network communication speed between the endpoint device and the target web server;
 communication latency between the endpoint device and the target web server;
 a quality of service condition of the communications between the endpoint device and the target web server;
 network communication speed between the endpoint device and a secured web gateway server;
 communication latency between the endpoint device and the secured web gateway server; and
 a quality of service condition of the communications between the endpoint device and the secured web gateway server.

17. The non-transitory, computer-readable storage medium of claim 16, wherein the endpoint device automatically switches to the second communication mode under one or more conditions, including:
 the network used in the web transaction in the first communication mode is no longer available;
 the endpoint device is using a virtual private network for communication with the target web server;
 the network communication speed between the endpoint device and the target web server falls below a threshold; or
 the quality of service of communications between the endpoint device and the Target web server falls below a threshold.

18. The non-transitory, computer-readable storage medium of claim 15, wherein
 the second communication mode includes
  establishing a side channel to a security service when the endpoint device initiates the web transaction with a web-enabled application; and
  using the side channel to enforce a security policy at the endpoint device, wherein the security policy is stored at the security service.

19. The non-transitory, computer-readable storage medium of claim 15, wherein the instructions are further configured for:
 generating data at a web-enabled application at the endpoint device for communication to the target web server;
 intercepting the data from the web-enabled application at a switching logic module;
 determining a status of the one or more communication performance conditions;
 in response to determining that the one or more communication performance conditions indicate use of the first communication mode,
  forwarding the intercepted data from the switching logic module to the proxy server for communication to the target web server; and
 in response to determining that the one or more communication performance conditions indicate use of the second communication mode,
  forwarding the intercepted data from the switching logic module to the target web server, wherein the forwarded data from the switching logic module bypasses the proxy server.

20. The non-transitory, computer-readable storage medium of claim 19, wherein the instructions are further configured for:
 in response to determining that the one or more communication performance conditions
  indicate use of the second communication mode,
  establishing a side channel to a security service,
  receiving a security policy from the security service at the endpoint device over the side channel;
  enforcing the security policy at the endpoint device to control communications between the endpoint device and the target web server; and
 selectively forwarding the intercepted data from the switching logic module to the target web server based on the security policy enforced at the endpoint device.

* * * * *